US006430615B1

(12) United States Patent
Hellerstein et al.

(10) Patent No.: US 6,430,615 B1
(45) Date of Patent: Aug. 6, 2002

(54) PREDICTIVE MODEL-BASED MEASUREMENT ACQUISITION EMPLOYING A PREDICTIVE MODEL OPERATING ON A MANAGER SYSTEM AND A MANAGED SYSTEM

(75) Inventors: Joseph L. Hellerstein, Ossining, NY (US); Nikolaus Haus, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/042,060

(22) Filed: Mar. 13, 1998

(51) Int. Cl.[7] .............................................. G06F 15/173
(52) U.S. Cl. ...................... 709/224; 709/202; 709/217; 709/226; 709/235
(58) Field of Search ................................ 709/202, 217, 709/224, 226, 235

(56) References Cited

U.S. PATENT DOCUMENTS

| | | | | |
|---|---|---|---|---|
| 4,769,761 A | * | 9/1988 | Downes et al. ............. | 709/224 |
| 5,692,107 A | * | 11/1997 | Simoudis et al. ............ | 706/12 |
| 5,748,098 A | * | 5/1998 | Grace .................... | 340/825.16 |
| 5,881,268 A | * | 3/1999 | McDonald et al. ..... | 395/500.44 |
| 5,951,644 A | * | 9/1999 | Creemer ................... | 709/229 |
| 5,974,457 A | * | 10/1999 | Waclawsky et al. ........ | 709/224 |
| 5,987,442 A | * | 11/1999 | Lewis et al. .................. | 706/10 |
| 6,058,103 A | * | 5/2000 | Henderson et al. ......... | 370/254 |
| 6,076,174 A | * | 6/2000 | Freund ........................ | 714/47 |
| 6,148,335 A | * | 11/2000 | Haggard et al. ............. | 709/224 |

OTHER PUBLICATIONS

A.S. Tanenbaum, "SNMP—Simple Network Management Protocol, Section 7.3.1, The SNMP Model," Computer Networks, Third Edition, Prentice Hall PTR, pp. 631–633, 1996.

(List continued on next page.)

Primary Examiner—Saleh Najjar
(74) Attorney, Agent, or Firm—Gail H. Zarick

(57) ABSTRACT

A method, system and program storage device for measurement acquisition using predictive models which: (a) can improve scalability; (b) can accommodate devices that operate in a disconnected mode; and (c) enable integration of data from sources with different time granularities. Various features can be embodied in software and an object-oriented implementation is described. Different implementations are described, such as standalone predictive models implemented only on a manager (for example systems management/load balancing) or managed system (for example router management); or a parallel implementation with predictive models running on both the manager and managed (agent) systems (for example financial trading or system health monitoring). In a parallel model implementation, the agent constructs a predictive model that is conveyed to the manager system. The models are used in parallel, possibly with no communication for an extended time. The manager uses its model to provide tentative values of measurement variables to management applications. The agent uses its model to check its accuracy. If the model is found to be insufficiently accurate, an updated model is transmitted to the manager. The invention allows other measurement acquisition protocols to operate concurrently on the same measurement variables.

48 Claims, 26 Drawing Sheets

OTHER PUBLICATIONS

G. Booch, "Classes and Objects," Chapter 3, Object–Oriented Analysis and Design With Applications, Second Edition, The Benjamin/Cummings Publishing Company, Redwood City, CA, pp. 81–91, 1994.

B. Gaddouna et al., "Fault Detection Observers for Systems with Unknown Inputs," Proceedings of Fault Detection, Supervision, and Safety for Technical Processes, Jun. 13–16, pp. 59–64, 1994.

T.M. Cover et al., "Data Compression," Chapter 5, Elements of Information Theory, John Wiley & Sons, Inc., pp. 78–82, 1991.

M.B. Priestley, "Time Series Analysis: Use of Spectral Analysis in Practice," Spectral Analysis and Time Series, Academic Press Limited, pp. 18–27, 1981.

G.E.P. Box et al., "Stochastic and Deterministic Dynamic Mathematical Models," Time Series Analysis Forecasting and Control, Prentice Hall, pp. 7–12, 1976.

A.V. Aho et al., "The Theory of Parsing, Translation and Compiling," Prentice–Hall, Inc., pp. 139–143, 1972.

M. J. Feely et al., "Implementing Global Memory Management in a Workstation Cluster", SIGOPS, 12/95, pp. 201–212.

C. S. Hood et al., "Automated Proactive Anomaly Detection", pp. 688–699.

M. J. Litzkow et al., "Condor—A. Hunter of Idle Workstations", The 8th International Conference of Distributed Computing Systems, Jun. 1988, pp. 104–111.

R.F. Berry et al., "A Flexible and Scalable Approach to Navigating Measurement Data in Performance Management Applications", Proceedings of the Second International Conference on Systems Management, 13 Pages, Jun. 19–21, 1996.

R. A. Maxion, "Anamoly Detection for Diagnosis", pp. 20–27, 1990 IEEE.

N. Hachem et al., "Approximate Query Answering in Numerical Databases", Eighth International Conference on Scientific and Statistical Database Systems, pp. 63–73, Jun., 1996.

D. L. Mills, "Network Time Protocol (Version 2) Specification and Implementation", Network Working Group, University of Delaware, 61 pages, Sep., 1989.

* cited by examiner

Simple Classes

| | |
|---|---|
| 3010 | Accuracy - how close the observed value is to the predicted value |
| 3020 | Boolean |
| 3040 | ElapsedTime - time in appropriate units |
| 3060 | HeartBeatInterval - time between heartBeat messages |
| 3050 | ObjectID - identifies an object, thereby enabling its methods to be invoked |
| 3110 | SampleInterval - time between samples taken |
| 3120 | Timestamp - timestamp obtained from an agent's clock |
| 3130 | TimerID - identifier of a timer |
| 3150 | void - no value is defined |

Fig. 3A

Application Methods

30010 — void notify(DataItem)

Fig. 3B

ManagerProtocolHandler Methods

| | |
|---|---|
| 4005 | void concurrentUpdate(DataItem) |
| 4010 | void createModel(VariableID, ModelSpecification) |
| 4020 | void getDataReply(DataValue, Timestamp) |
| 4030 | void heartBeat(VariableID) |
| 4040 | void modelUpdateRequest(VariableID) |
| 4050 | void modelUpdateReply(VariableID, ModelSpecification) |
| 4060 | void subscribe(ManagedSystem, VariableID, Accuracy, HeartBeatInterval, SampleInterval) |
| 4070 | void timerExpiration(VariableID) |
| 4080 | void unsubscribe(VariableID) |

Fig. 4

AgentProtocolHandler Methods

| |
|---|
| Boolean checkModel(VariableID) |
| void concurrentUpdate(DataItem) |
| Timestamp getModelConfirmationTime(VariableID) |
| void getDataRequest(VariableID) |
| void subscribe(VariableID, Accuracy, HeartBeatInterval, SampleInterval) |
| void timerExpiration(VariableID) |
| void unsubscribe(VariableID) |

ManagerModelHandler Methods

| |
|---|
| void createModel(VariableID, ModelSpecification) |
| void deleteModel(VariableID) |
| dataValue getPredictedValue(VariableID, Timestamp) |
| void updateModel(VariableID, ModelSpecification) |

6010 — createModel
6020 — deleteModel
6030 — getPredictedValue
6040 — updateModel

Fig. 6A

AgentModelHandler Methods

| | |
|---|---|
| 7010 | ModelSpecification defineModel(VariableID, Accuracy) |
| 7020 | void deleteModel(VariableID) |
| 7040 | DataValue getPredictedValue(VariableID, Timestamp) |

Fig. 7

Timer Methods

| | |
|---|---|
| 8010 | void deleteTimer(TimerID) |
| 8020 | void resetTimer(TimerID, ElapsedTime) |
| 8030 | TimerID setTimer(EntryPoint, ElapsedTime) |

Fig. 8

AgentDataAccessFacility Methods

| | |
|---|---|
| 9010 | dataValue getValue(VariableID) |
| 9020 | void startCollection(VariableID) |
| 9030 | void stopCollection(VariableID) |

Fig. 9

ManagerMeasurementRepository Methods

| | |
|---|---|
| 10005 | void deleteVariable(VariableID) |
| 10010 | StatusCode getStatusCode(VariableID, Timestamp) |
| 10020 | DataItem getValue(VariableID, Timestamp) |
| 10030 | void updateValue(VariableID, Timestamp, DataValue) |
| 10040 | void putValue(VariableID, Timestamp, DataValue) |
| 10060 | void subscribe(ManagerSystem, VariableID, Accuracy, HeartBeatInterval, SampleInterval, ObjectID) |

Fig. 10

AgentMeasurementRepository Methods

| |
|---|
| 11005 — void deleteVariable(VariableID) |
| 11020 — DataItem getValue(VariableID, Timestamp) |
| 11040 — void putValue(VariableID, Timestamp, DataValue) |

Fig. 11

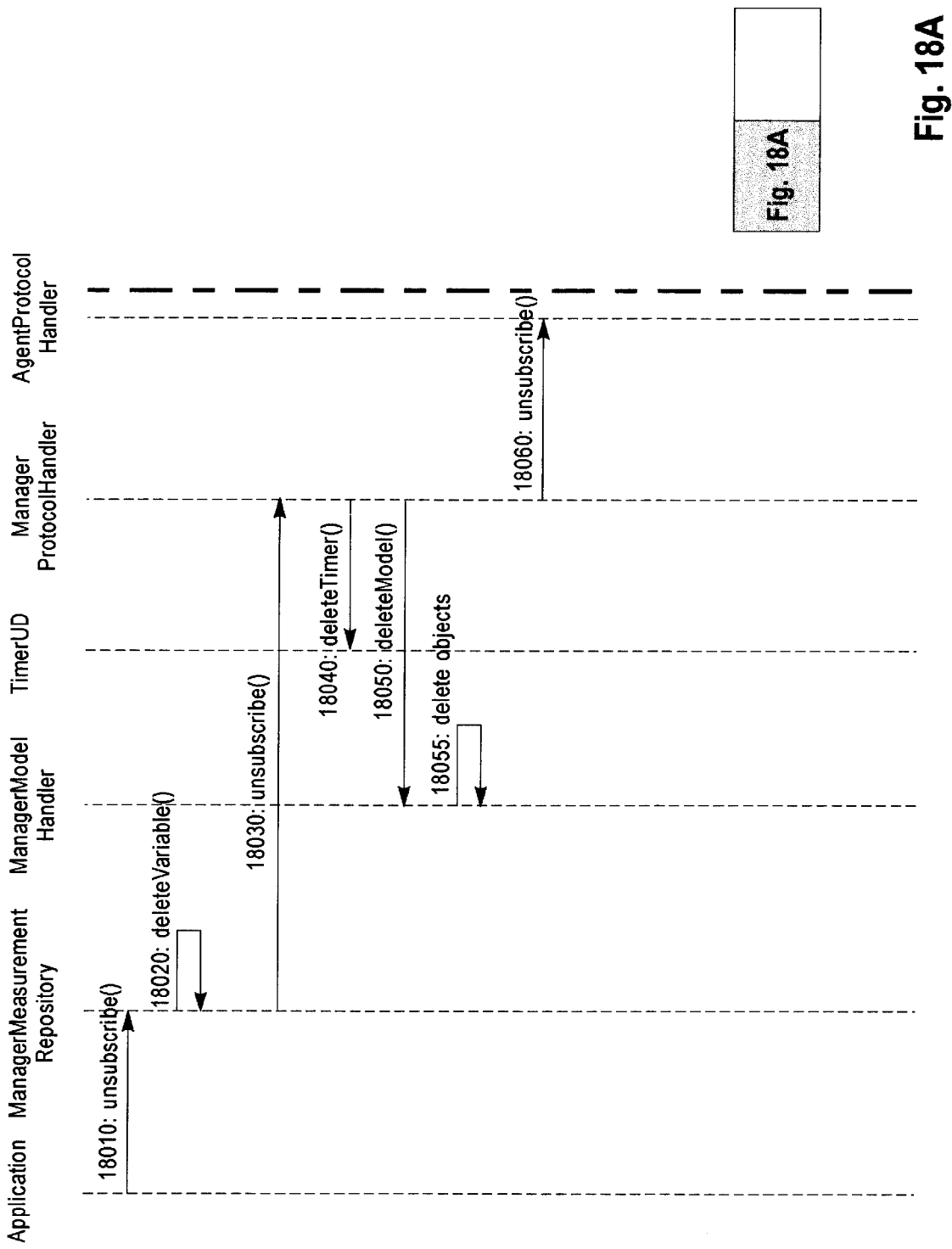

PREDICTIVE MODEL-BASED MEASUREMENT ACQUISITION EMPLOYING A PREDICTIVE MODEL OPERATING ON A MANAGER SYSTEM AND A MANAGED SYSTEM

FIELD OF THE INVENTION

The present invention relates generally to the operations and management of networked systems. A particular version is related to acquiring measurements of computer and communications systems in distributed environments.

BACKGROUND

This invention relates to operations and management (OAM), such as considerations for security, performance, and availability. OAM accounts for 60% to 80% of the cost of owning network-connected information systems (according to leading analysts). These costs are expected to increase over the next several years due to the proliferation of networked applications and hand held devices, both of which make extensive use of services in distributed systems.

In an OAM system, the entities being controlled are called managed systems (also called agent systems). This control is typically exercised in part by software present on the managed systems. In addition, there are manager systems (also called managers) that are dedicated to OAM functions. Managers provide an environment for executing management applications (hereafter, applications) that provide functions such as detecting security intrusions, determining if managed systems are accessible, and responding to performance degradation.

A corner stone of OAM is measurement. Measurements include: (a) information on network activities that are suggestive of security intrusions; (b) the response times for "ping" messages sent to remote systems to determine if they are accessible; and (c) indicators of resource consumption that are used to diagnose quality of service problems. The term measurement acquisition protocol (MAP) is used to refer to a method of delivering measurements of managed systems to manager systems. A major concern with the proliferation of low-cost computing devices is developing scaleable MAPs. The present invention addresses this concern. It also addresses issues related to disconnected operations (which is increasingly common for low-powered devices) and synchronizing time stamps from multiple sources (which is problematic when systems have separate clocks, a situation that is common in practice).

A MAP allows one or more managers to access measurement variables collected on one or more managed systems. Examples of measurement variables are kernel CPU and user CPU as defined in the output of the UNIX (TM) vmstat command. The value of a measurement variable at a specific time is called a data item. Data items have a time stamp that identifies when they were obtained from the managed system.

Prior art for MAPs includes: polling, subscription, and trap-directed polling. In polling (e.g., SNMP-based measurement acquisition), the manager periodically requests data from the managed system. Thus, acquiring N data items requires 2N messages.

Subscription-based approaches can reduce the number of messages required for measurement acquisition. Here, the manager sends a subscription request to the managed system. This request specifies how often the managed system sends values of the measurement variable to the manager. Thus, acquiring N data items requires on the order of N messages. While this is a considerable reduction compared to polling, a large number of messages are still exchanged.

Still more efficiencies can be obtained by using trap-directed polling (e.g., Tannenbaum, 1996). As with the previous approach, a subscription is sent from manager to managed systems. However, the managed system does not send a data message unless the variable changes value. This works well for variables that are relatively static, such as configuration information. However, this is equivalent to the subscription approach if variables change values frequently. Unfortunately, the latter is the case for many performance and availability variables, such as TCP bytes sent in IP stacks and the length of the run queue in UNIX systems.

Several techniques can improve the scalability of existing MAPs. However, none of these techniques effectively circumvents the scalability deficiencies of existing MAPs. One approach is to batch requests for multiple measurement variable into a single message. Replies can be batched in a similar way. Doing this reduces the number of messages exchanged to approximately N/B, where N is the number of data items and B is the number of data items in a batch.

While batching has merits, it has significant limitations as well. First, its benefits are modest if only a few variables are needed at a high sampling rate; that is, B is small and N is large. Second, batching can be done only for variables that are obtained from the same managed system. Thus, if there are a large number of systems from which only a few variables are needed, the benefits of batching are limited.

A second way to improve scalability is to poll less frequently, which reduces N. However, a long polling interval means that errant situations may go undetected for an extended period of time. Thus, installations are faced with the unpleasant choice of carefully managing a few systems or poorly managing a large number of systems.

A third approach to improving scalability is to report information only when an exceptional situation arises (e.g., Maxion, 1990). This approach is widely in practice. However, it has significant limitations. First, by its nature, exception checking requires that the managed system, inform the manager when difficulties arise. This can be problematic if the managed system is so impaired that it cannot forward a message to the manager. A further issue with exception checking is that some exceptional situations involve interactions between multiple managed systems. Detecting these situations requires forwarding data to a manager on a regular basis.

In addition to scalability, existing MAPs have other shortcomings as well. First, existing MAPs do not support disconnected operation in which the manager cannot communicate with the managed system. Disconnected operation is common in low-end devices that operate in stand-alone mode (e.g., to provide personal calendaring services or note pad capabilities) so as to reduce power consumption. Unfortunately, existing MAPs require that managers be connected (possibly indirectly) to the managed system in order to obtain measurement data for that system.

A second issue in existing MAPs is their lack of support for integrating data from multiple systems and for combining data with different time granularities. Such capabilities are important in problem determination and isolation (e.g., Berry and Hellerstein, 1996). Unfortunately, integration is often impaired in practice since adjusting measurement data to account for the diverse interval durations used in the measurement collection requires a model of the time serial behavior of measurement variables. Such considerations are beyond the scope of current MAPs.

In summary, MAPs are a core technology in OAM. Existing art for MAPs is deficient in several respects. Current approaches scale poorly. They do not address disconnected operation. And, they do not help with integrating measurement data from multiple managed systems.

Predictive models have been applied in some management contexts. A commonly used class of predictive models are time series models (e.g., Box and Jenkins, 1976). Time series models have been applied directly to management problems, such as in Hood and Ji, 1997. An example of a time series model is $$x(t)=a^*x(t-1)+b^*x(t-2), \qquad \text{Eq (1)}$$

where x(t) is the value of the variable at time t, and a and b are constants that are estimated using standard techniques. For example, x(t) might be the average response time of transactions during time interval t. A more complex model might take into account other factors, such as the number of requests, denoted by y(t), and their service times, denoted by z(t):

$$x(t)=a'^*x(t-1)+b'^*x(t-2)+c^*y(t)+d^*z(t). \qquad \text{Eq (2)}$$

Even more sophisticated predictive models consider non-linear terms, such as powers of x, y, and z. As detailed in Box and Jenkins, 1976, time series models can forecast values for an arbitrary number of time units into the future (although the variance of the forecasts increases with the forecast horizon).

Models are also known in various other contexts, such as:
- Compression schemes (e.g., Cover and Thomas, 1991) which reduce the data volumes sent between communicating computers by employing predictive models for data values.
- Feedback control systems (e.g., Freeley et al., 1995) which employ predictive algorithms that anticipate data values, such as in a caching system.
- Timer protocols (e.g., Mills, 1989) which coordinate distributed models of clocks to provide clock synchronization.
- Schedulers for distributed systems (e.g., Litzkow, 1988) have a model of the systems being scheduled.
- Schemes for providing approximate query results use statistical models to estimate these results (e.g., Hachem and Taylor, 1996).

None of the foregoing provide a method and a system whereby the managed system knows the values predicted by the manager for models that use historical data. None of the foregoing employs a method and a system for dynamically creating and deleting model specifications. Rather, existing art establishes model definitions when the system is designed. Further, in the existing art, updating models is restricted to changing their parameters. None of the foregoing provide for managing tentative updates (e.g., via heartbeat messages). The present invention addresses these needs.

SUMMARY

Accordingly, the present invention is directed to an improved measurement acquisition system and method. In an application to distributed systems with properly enabled management applications, the present invention has features for: (1) reducing the volume of messages exchanged between managers and agents (also called managed systems); (2) addressing disconnected operation;, and (3) synchronizing time stamps. These benefits are provided by using predictive models that run in a coordinated manner on manager and managed systems.

The present invention has features which reduce the volume of messages exchanged between manager and managed systems. This technique is referred to as model-based measurement (MBM). In one example, MBM is accomplished by a method and a system that creates, uses, updates, and deletes predictive models in a manner that is coordinated between manager and managed systems. The method can be embodied as software, e.g., using well known object oriented programming technology, and stored on a program storage device for execution on a data processing system. As in subscription-based measurement acquisition protocols, the manager can send a subscription message to the managed system. In another example, the subscription may also specify an accuracy bound (e.g., a percent deviation from the actual value) for the predicted values. Agent software on the managed system then constructs a predictive model based on variable values on the managed system. This model is returned to the manager. The manager uses the predictive model to satisfy requests by management applications for values of the subscribed-to measurement variable. The managed system uses the predictive model to detect excessive deviations of predicted values from measured values. When this occurs, the agent software sends an updated model to the manager. Periodically, the managed system sends a "heartbeat" message to the manager. This message indicates which variables are confirmed to have predicted values that lie within the accuracy bounds specified by the manager.

In one example, values of measurement variables in the manager are kept in a measurement repository. These values have an associated status code that indicates how they were obtained. A value is tentative if it has been predicted but the managed system has not received a heart-beat message confirming that the prediction is within the accuracy bounds. A value is confirmed if such a message has been received. A value is actual if it was obtained from measurement facilities on the managed system. Here, management applications using data obtained with this version of the present invention must be adapted to handle these status codes. In particular, a tentative value may be changed if, through interactions between the manager and managed systems, it is subsequently determined that the data item is not within the range of accuracy desired by the manager. It is straightforward to provide a notification mechanism so that management applications are informed of such situations.

One example of a system in accordance with the present invention includes components on both manager and managed systems. One example of the components on the manager includes:

A plurality of management applications adapted to use predicted values and to handle measurement values with the above-mentioned status codes;

A measurement repository that stores measurement values, their status codes, and their time stamps;

A manager model handler that creates, updates, deletes, and uses predictive models of measurement variables; and A manager protocol handler that provides overall coordination of MBM on the manager and exchanges messages with managed systems.

One example of the components on the managed system include:

An agent protocol handler that provides overall coordination of MBM on the managed system and exchanges messages with one or more managers;

An agent model handler that defines, updates, deletes, and uses predictive models on the managed system;

A plurality of agent data access facilities that provide actual values of measurement variables; and An agent measurement repository that contains the measured values of subscribed-to variables that are known to the manager.

An example of a method having features of the present invention operates as follows. A management application interacts with the manager measurement repository to specify measurement variables for which a subscription is requested. The manager measurement repository notifies the manager protocol handler, which in turn sends a subscription message to the managed system. The subscription message specifies a desired accuracy. This message is received by the agent protocol handler. There is a period of time during which the managed system reports measured values to the manager. These values are recorded in the agent measurement repository to track the measured values known to the manager. Such tracking is necessary so that the agent model handler can produce the same estimates measurement variables as those produced by the manager protocol handler. Once sufficient data have been obtained, the agent model handler constructs a predictive model, such as by using well-known techniques for model identification and parameter estimation for time series data. The agent protocol handler then transmits this model, its parameters, and data inputs to the manager protocol handler, which in turn invokes the manager model handler create the model on the manager.

Next, the manager and managed systems may operate independently, possibly without any communications for an extended period. The manager protocol handler periodically updates the manager measurement repository using estimates obtained from the predictive model. The agent protocol handler periodically checks the accuracy of the predictive model. The agent connects to the manager only to send model updates and heart-beat messages Models constructed in this manner can be used to periodically update the measurement repository with values of the measurement variable. Such values have a status code of "tentative". Periodic "heart-beat" messages sent from the managed system to the manager indicate variables for which data items are confirmed to have the desired accuracy (as specified in the manager's subscription for the measurement variable). When such a confirmation is received for a value, its status code is changed from "tentative" to "confirmed".

For predictive models that accurately forecast the values of measurement variables, the foregoing can greatly reduce the volume of message traffic. However, there are some variables for which such models are unknown, at least in some operating circumstances. Further, it may be that certain changes in the components of a distributed system or their interconnections may cause the present invention to work poorly for a period of time. Thus, the present invention includes other features such that a measurement variable may have values obtained from a variety of MAPs that operate concurrently with MBM. Doing so requires having a third status code, actual, that indicates that the value was obtained from the measurement data access facilities on the managed system.

The present invention offers significant advantages over existing art. First, the invention provides improved scalability. In existing art, requests by management applications for non-static variables (e.g., counters such as the number of bytes sent on a TCP socket) require that a message be sent from the managed system to the manager. The overhead of these messages becomes increasingly burdensome as networks grow more complex. The present invention can greatly reduce network traffic and the associated performance issues (if the predictive models are sufficiently accurate). In particular, if the predictive model can forecast accurately values of measurement variables that are H time units in the future, then MBM only requires on the order of N/H messages to acquire N data items. (Heart-beat messages are considered to be a small fraction of the message exchange.) In contrast, existing MAPs require on the order of N messages (at least) if data values change frequently. Further, as with existing MAPs, MBM can employ batching of measurement variables. Doing so reduces the number of messages exchanged for MBM to N/(HB).

Second, the present invention offers a solution to managing palmtop and other low-end devices that often operate in disconnected mode. The challenge here is knowing about devices for which communication is possible only intermittently. Polling and subscription approaches are ineffective with disconnected devices. However, given sufficiently accurate predictive models, the present invention provides management applications with estimates of variable values. Doing so enables exception checking and health monitoring even if measurements of managed systems are not available.

Third, once a predictive model is available to the managed system, it can be used to aid in integrating data from multiple sources. For example, the present invention provides a way to synchronize data collected from multiple managed systems that have different collection frequencies and/or clocks that are not synchronized. Such considerations are particularly important in diagnostic situations and for operations consoles where a uniform perspective is essential. By using predictive models, the manager can adjust the granularity of the time stamp using techniques such as those in Priestly, 1981. In contrast, existing approaches to measurement acquisition provide little assistance with synchronizing data from multiple sources.

A specific and central problem is dealing with data that are collected at different frequencies. For example, resource data may be collected every fifteen minutes, but transaction data might be collected every minute. Commonly, such situations are addressed by aggregating data to the coarsest granularity. In this case, the transaction data are aggregated into fifteen minute intervals. However, with a predictive model, it is possible to interpolate values so that estimates of finer grain data can be obtained (e.g., using spectral techniques, as in Priestly, 1981).

To summarize, various versions of the present invention include the following characteristics:

Its context is the acquisition of measurement data in distributed systems.

It provides for creating, updating, and deleting predictive models in a manner that is coordinated between manager and managed systems.

It employs status codes for data items, wherein values supplied to management applications have a status code of "tentative", "confirmed", or "actual".

Other measurement acquisition protocols can be run concurrently with the present invention, and the same variable may use multiple measurement acquisition protocols in a manner that is transparent to the management application.

The present invention has still other features whereby the managed system knows the values predicted by the manager for models that use historical data. Such a capability is required in MBM so that the managed system knows the accuracy of the estimates produced by the manager. Providing this requires more than ensuring that both systems have the same predictive model. It also requires that both systems use the same input data to this model. One version of the present invention makes this possible by: (a) a system that incorporates an AgentMeasurementRepository component that stores variable values known to the manager and (b) a method that synchronizes data values in the ManagerMeasurementRepository with those in the AgentMeasurementRepository.

The present invention has yet other features for dynamically creating and deleting predictive model specifications, wherein such a specification includes a model definition (i.e., its algebraic form, such as Eq (1) vs. Eq. (2)), its parameters (e.g., a and b in Eq. (1)), and its inputs (which measurement variables are used). In contrast, existing art establishes model definitions when the system is designed. Further, in the prior art, methods of updating models are restricted to changing the their parameters.

BRIEF DESCRIPTION OF THE DRAWINGS

These and various other features, advantages and alternatives within the spirit and scope of the claimed invention will be apparent to those skilled in the art by reading the detailed description with reference to the drawings, wherein:

FIG. 3A depicts examples of simple classes to define inputs to and outputs from class methods;

FIG. 3B lists an example of a method in the Application class;

FIG. 4 lists examples of methods in the ManagerProtocolHandler class;

FIG. 5 lists examples of methods in the AgentProtocolHandler class;

FIG. 6A lists examples of methods in the ManagerModelHandler class;

FIG. 7 lists examples of methods in the AgentModelHandler class;

FIG. 8 lists examples of methods in the Timer class;

FIG. 9 lists examples of methods in the AgentDataAccessFacility class;

FIG. 10 lists the methods in the ManagerMeasurementRepository class.

FIG. 11 lists examples of methods in the AgentMeasurementRepository class;

FIGS. 18A and 18B depict an example of an Unsubscribe scenario;

DETAILED DESCRIPTION

Figure 1A:
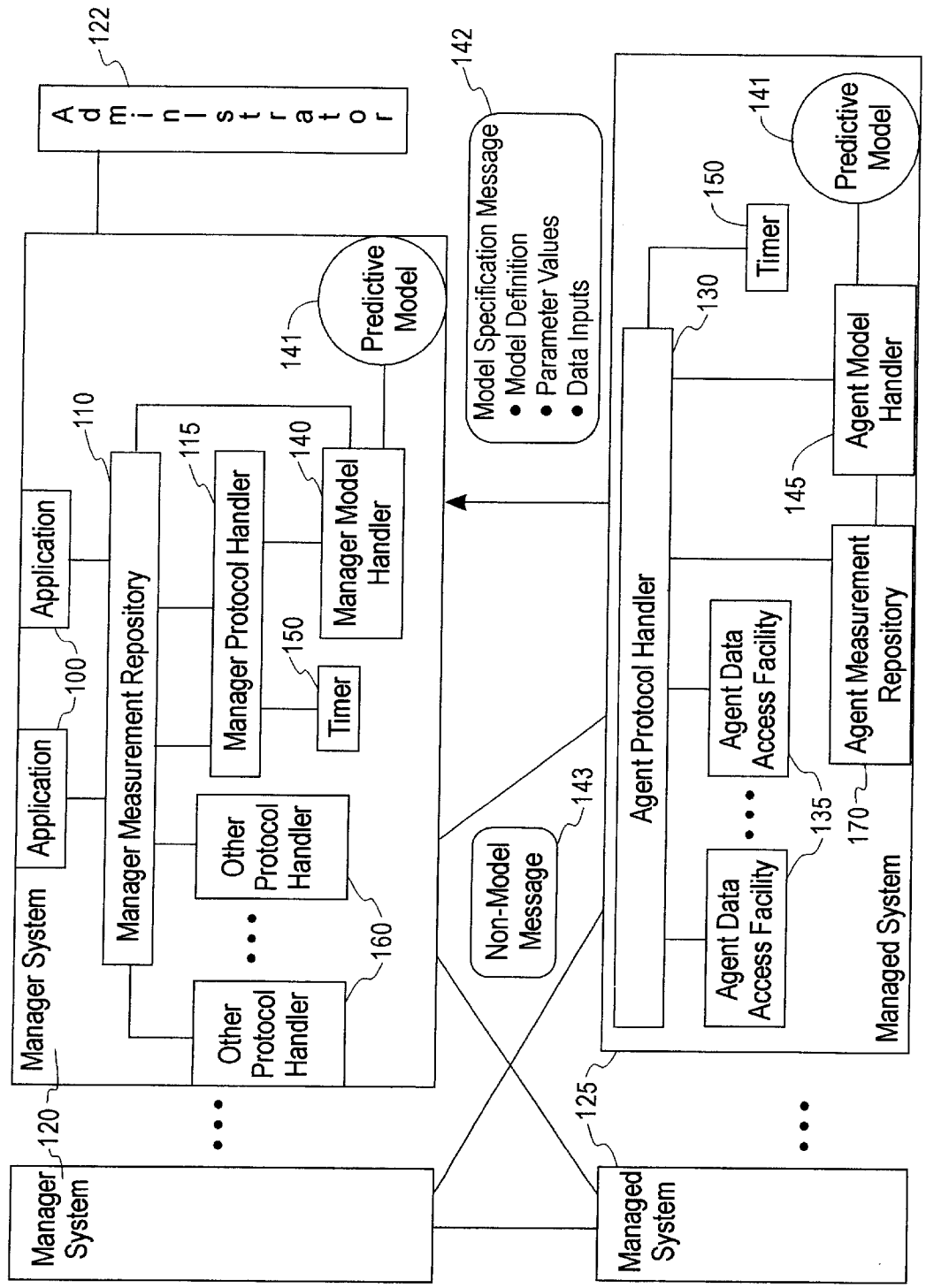
FIG. 1A depicts an example of a system having features of the present invention.

FIG. 1A depicts an example of a system having features of the present invention. As depicted, an administrator or other end-user (122) interacts with the manager (120) to manage or use information on (or available through) one or more managed (also called agent) systems (125).

The manager system (120) and/or managed system (125) hardware can be any mainframe or server architecture, including but not limited to those sold by the IBM Corporation under the trademarks ES9000, AS400, or RS6000. The managed system could also be an intermediary device such as a gateway, router, or proxy server; or an end-user device such as client machine such as a personal computer sold by IBM Corporation under the trademarks APTIVA and THINKPAD. Although shown "connected" to the manager system, those skilled in the art will appreciate that the managed system (125) could be a disconnectable "mobile" device such as a portable, handheld, or palmtop device. As is well known, the manager system (120) and/or managed system (125) can be running an operating system (not shown) including but not limited to: UNIX (a trademark of The Open Group); those sold by the IBM Corporation under the trademarks AIX, MVS, or OS2; or those sold by Microsoft under the trademarks WINDOWS NT, WINDOWS 95 or WINDOWS CE. Those skilled in the art will appreciate that the manager (120) and managed (125) systems may be connected by a network(s) (not shown) such as a LAN, WAN, or the Internet and communicating by appropriate well known networking protocols, such as Ethernet, Token Ring and/or the TCP/IP suite of protocols. Such hardware, software and networking alternatives and equivalents are well known to those skilled in the art, are not part of the present invention and thus will not be discussed further.

The manager (120) can include a plurality of management applications (100) that obtain measurement data from the manager measurement repository (110). Data items are supplied to this repository by the (MBM) manager protocol handler (115) and possibly other (non-MBM) protocol handlers (160). The manager protocol handler may use one or more timers (150) to periodically update the manager measurement repository with predicted values of measurement variables. These predictions are obtained from the manager model handler (140) based on one or more predictive models (141) and measurement data communicated from the managed system (125). Predictive models employed by the manager can be constructed from model specification messages (142).

As will be described in more detail below, the present invention has features for dynamically creating, updating and deleting predictive model specifications. In one example, the models include a model definition (i.e., its algebraic form, such as Eq (1) vs. Eq. (2)), its parameters (e.g., a and b in Eq. (1)), and data inputs (which measurement variables are used).

In order for the manager protocol handler to create the model on the manager, it can: (a) parse the model, the model parameters, and the data inputs sent by an agent protocol handler (130); (b) create objects for these elements; and (c) initialize these objects (e.g., build relationships between the objects). An alternative is to transmit to the manager system (120), the objects built on the managed system (125) by the agent model handler (140). For example, if Sun Microsystem's object oriented programming language, trademarked under the name JAVA is used, objects can be serialized (using Java'a built-in object serialization functionality) on the managed system and then transmitted to and reconstructed on the manager system.

Interactions with the managed system (125) and overall coordination of MBM on the manager is handled by the manager protocol handler (115). In this example, two types of messages are exchanged between the manager (120) and managed system (125). A model specification message (142) is sent from managed system (125) to the manager (120); it contains a model definition, its parameter values, and the data inputs. A non-model message (143) does not contain a model specification; such messages are exchanged bi-directionally. Within the managed system, the agent protocol handler (130): (a) handles requests from and replies to the manager; (b) uses the agent model handler (145) to create, update, and check the validity of the predictive models (141) provided to managers; and (c) keeps a record in the agent measurement repository (170) of the measurement values known to the manager. Model checking, updating, and confirmations are done periodically, as governed by the timer components (150). One or more agent data access facilities (135) provide access to measurements of the managed system. Predictive model(s) (141) on the managed system are constructed by the agent model handler.

MBM can be applied to areas other than the management of information technology resources. In particular, and by way of example only, consider a financial application. This application trades securities in markets around the world. As such, obtaining current pricing information is critical. To this end, the financial application runs on a manager system (120) node that obtains pricing data from multiple agent systems (125) that supply data for specific markets.

Thus, MBM can provide a low-overhead way to obtain current pricing data if there are reasonably accurate predictive models for the prices of the interest (e.g., time series models, such as those used to forecast econometric data). Here, the Application (100) is a trading application. The Manager Measurement Repository (110) contains pricing data. The Manager Protocol Handler (115) communicates with the agents (125) that supply the pricing data. The Manager Model Handler (140) constructs predictive models of the pricing data based on information supplied by the agents that supply this data. The Agent Procotol Handler (130) communicates with the Manager Protocol Handler to supply the pricing data and model specifications (142). The Agent Data Access Facility (135) obtains pricing data for a specific security. The Agent Measurement Repository (170) contains pricing data that corresponds to that maintained on the manager. The Agent Model Handler (145) constructs predictive models based on the pricing data in the Agent Measurement Repository (170). The Other Protocol Handler (160) provides alternative means for accessing pricing data. The Timer (150) provides a mechanism for initiating periodic actions in the Manager Protocol Handler (115) and the Agent Protocol Handler (130).

Figure 1B:
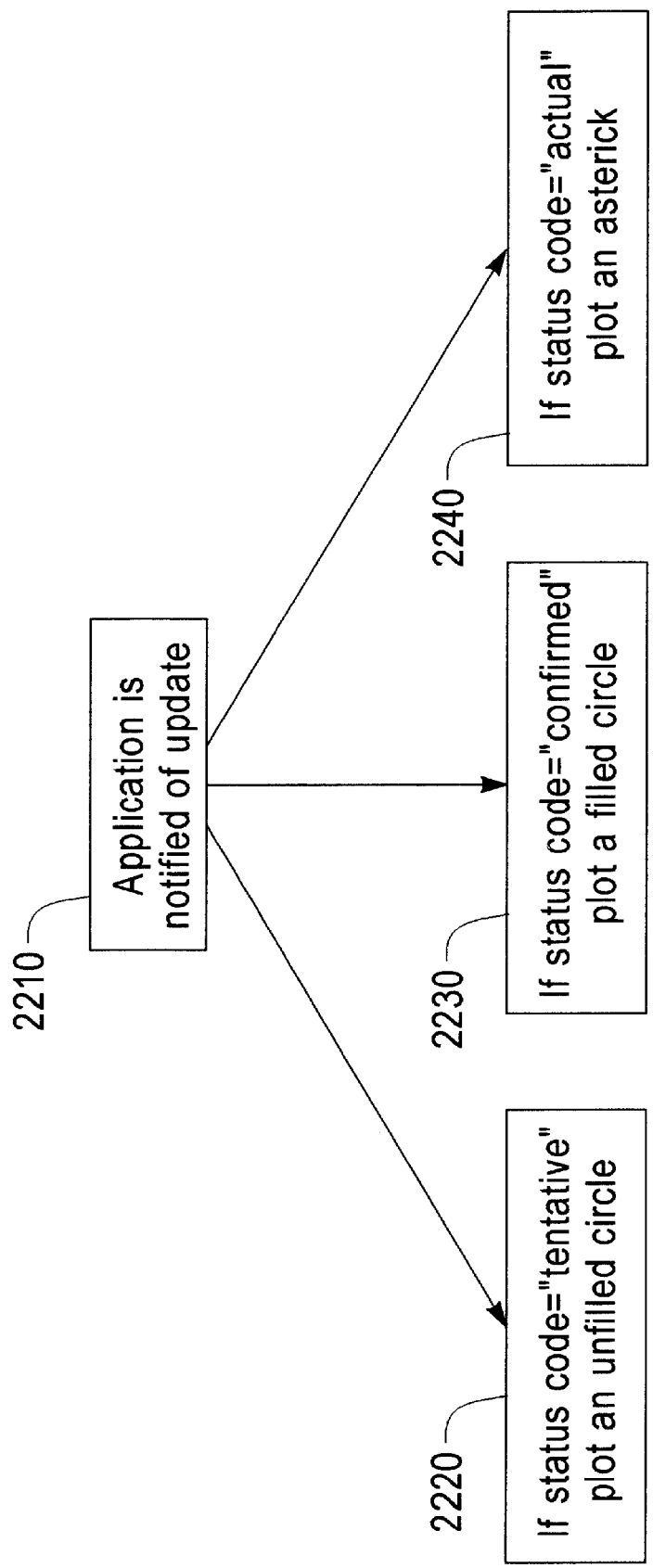
FIG. 1B depicts an example of a flow in a health-monitoring application once it is notified of an update to the ManagerMeasurementRepository.

Consider now an example of a management application. FIG. 1B depicts an example of a flow that will be discussed in a health-monitoring application (although the flow is fully general). In this example, the application (100) plots data items such as CPU utilization, response times, and network utilizations, all of which are of interest to administrators who want a "live feed" of the wellness of the managed systems (125). As depicted, the flow begins at block 2210, with the application being notified that a data item has been created or modified. The application then (100) checks the status for the data item. In block 2220, if the data item has a status code of "tentative", the value is plotted (e.g., as an open circle) to indicate that it is based on model predictions. In block 2230, if the data item has a status code of "confirmed", this can be plotted (e.g., with a filled circle) to indicate a higher level of confidence. In block 2240, if the data item has a status code of "actual", the data value can be plotted (e.g., with an asterisk) to indicate that this represents an actual value.

Although an object-oriented software approach is used to describe the operation of the present invention (see e.g., Booch, 1994), those skilled in the art will appreciate that many other implementations are within the spirit and scope of the present invention. Objects are instances of classes. Classes define methods (procedures) and attributes (variables) that are common to all objects within the same class. A system is specified in terms of: (a) a class diagram that displays which classes know about (e.g., have pointers to) which other classes; (b) descriptions of the methods that each class provides; and (c) scenarios that show how sequences of steps can be used to achieve desired functions. In this example, the convention is that class names begin with an upper case letter; method names begin with a lower case letter and end with parentheses (to indicate that they are functions); and scenario names are in bold italics.

Begin with the class diagrams. Standard Booch notation is used in which: (a) a cloud indicates a class; (b) inheritance is indicated by an arrow that points from the child class to its parent; (c) the knows-about relation is depicted by a line that has a solid dot attached to the class that knows about the class at the other end of the line; and (d) a one-to-many knows-about relationship is specified by a "knows-about" line that is annotated with a lower case n.

Figure 2A:
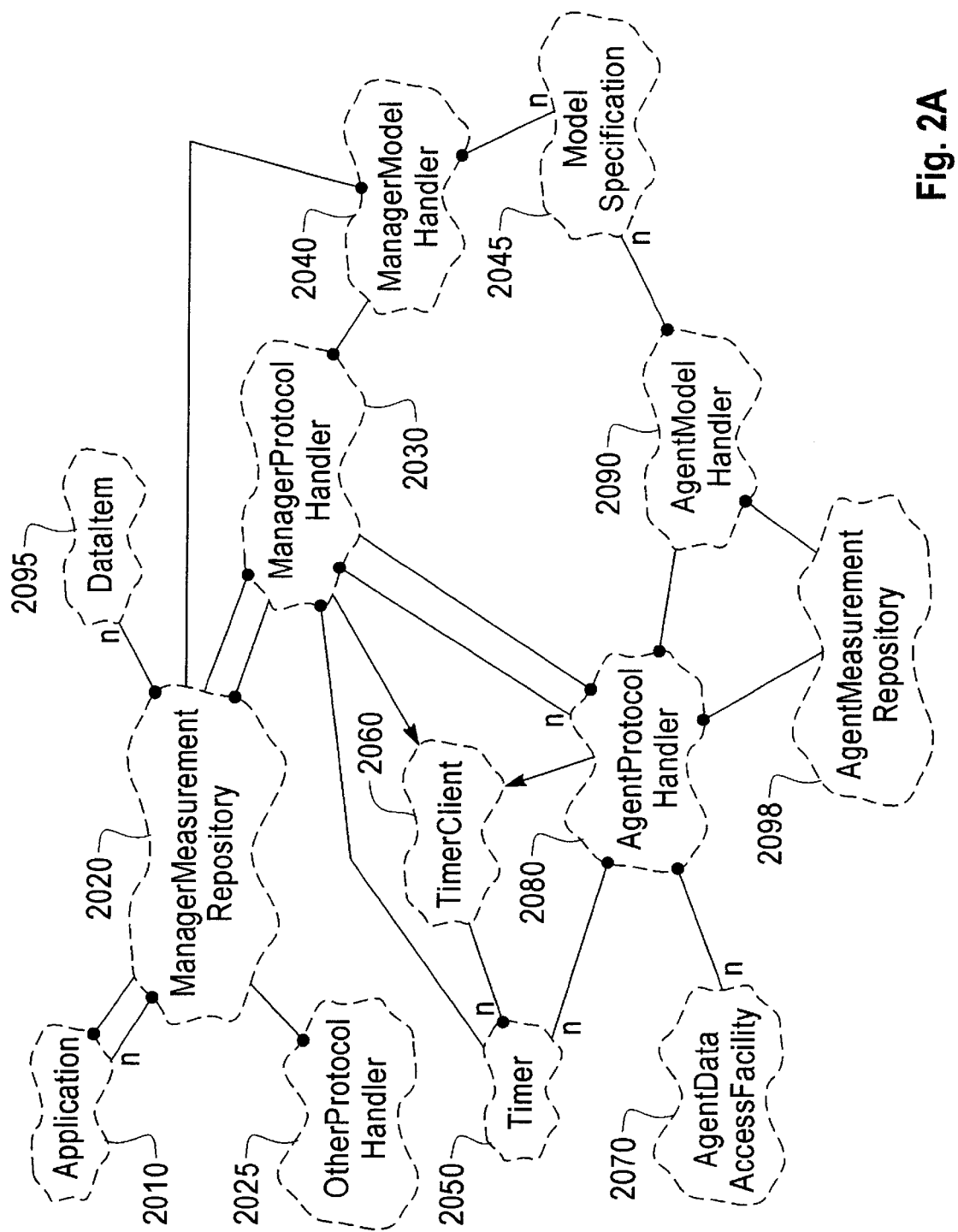
FIG. 2A depicts a class diagram in an object-oriented version of the components of FIG. 1.
Figure 2B:
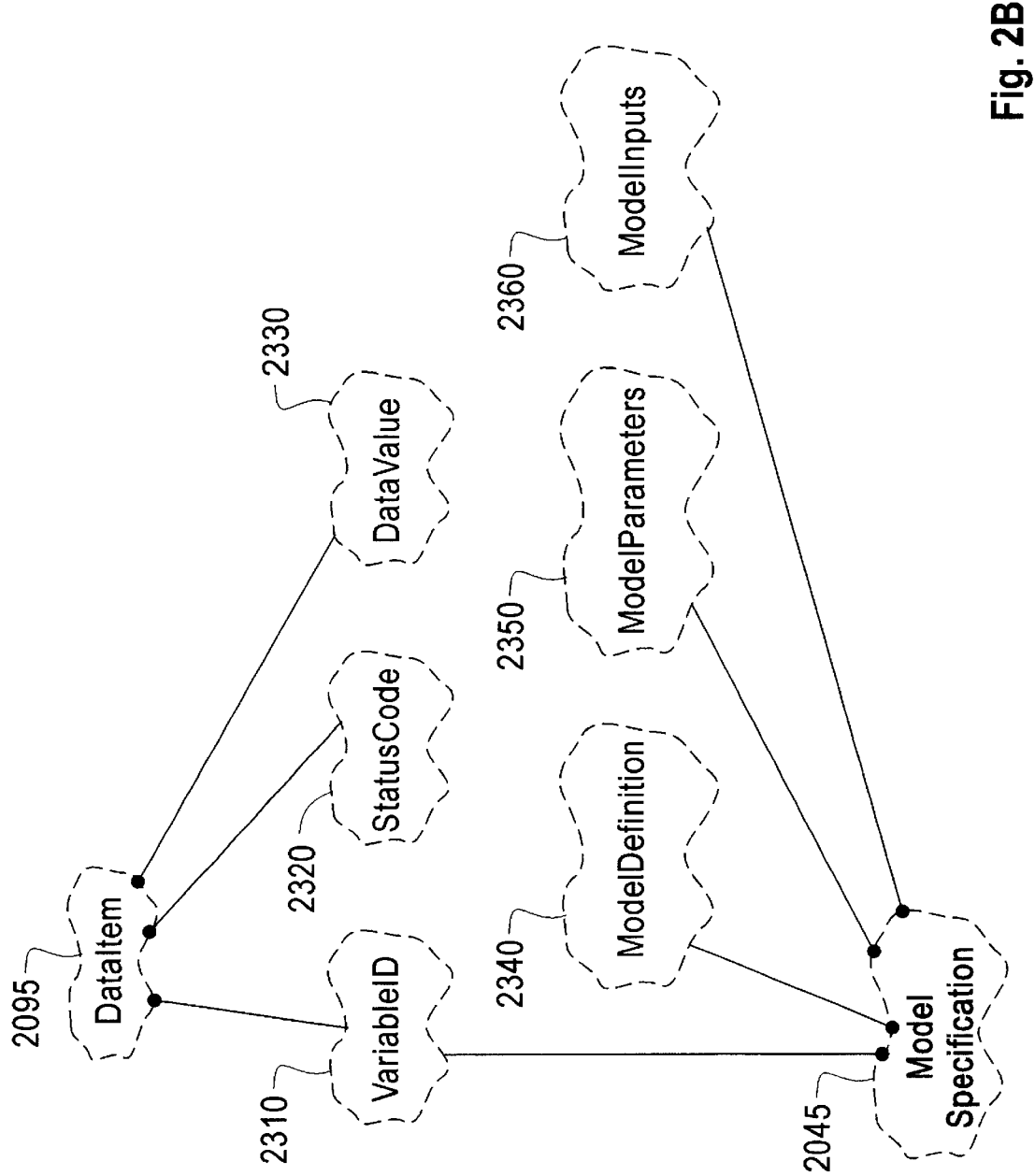
FIG. 2B depicts a more detailed example of class diagrams for the DataItem and ModelSpecification classes of FIG. 2A.

FIG. 2B depicts an example of a class diagram for a superset of the components in FIG. 1A. As depicted, an Application (2010) object knows about a ManagerMeasurementRepository (2020), and a ManagerMeasurementRepository knows about all Application objects that have MBM subscriptions. A ManagerMeasurementRepository contains a plurality of DataItem (2095) objects. There is one DataItem object for each data item in the ManagerMeasurementRepository. A ManagerMeasurementRepository knows about a ManagerProtocolHandler (2030), and the reverse holds as well. The OtherProtocolHandler (2025) objects know about the ManagerMeasurementRepository (2020).

The ManagerProtocolHandler (2030) knows about a ManagerModelHandler (2040). The ManagerModelHandler has a plurality of ModelSpecification (2045) objects, each of which describes a model for measurement of a variable. The ManagerProtocolHandler also knows about a plurality of Timer (2050) objects. Specifically, the ManagerProtocolHandler knows about one Timer object for each measurement variable. The Timer (2050) knows about the client for which it is created. Thus, the ManagerProtocolHandler (2030) is a subclass of a TimerClient (2060) (as indicated by the arrow).

The TimerClient (2060) is a common abstraction that allows Timer objects to invoke a special method (timerExpirationo( )) in the TimerClient. The use of such abstractions provides modularity in object-oriented applications. To one skilled in the art, the definition and implementation of the TimerClient is straight forward. As such, it is not addressed further.

The ManagerProtocolHandler (2030) object knows about a plurality of AgentProtocolHandler (2080) objects. The AgentProtocolHandler only knows about a single ManagerProtocolHandler. The AgentProtocolHandler uses two Timer (2050) objects for each measurement variable. One Timer tracks the interval for checking the variable's predictive model. The second Timer determines when to send a heart-beat message to the manager. The AgentProtocolHandler inherits from the TimerClient (2060). The AgentProtocolHandler knows about a plurality of AgentDataAccessFacility (2070) objects (one for each type of data, such as vmstat, netstat, and iostat in UNIX systems); and the AgentProtocolHandler also knows about an AgentModelHandler (2090). The AgentProtocolHandler and AgentModelHandler know about an AgentMeasurementRepository object (2098), which is used to record measurement values reported to the manager. As such, an AgentMeasurementRepository (2020) knows about a plurality of DataItem (2095) objects. The AgentModelHandler constructs predictive models for measurement variables and provides a way to check their accuracy.

FIG. 2B depicts an example of a class diagram describing the DataItem (2095) and the ModelSpecification (2045) classes in more detail. As depicted, a DataItem (2095) includes: (1) a VariableID (2310) that indicates the measurement variable for which the DataItem provides a value, (2) preferably a StatusCode (2320) that specifies the status (i.e., "tentative", "confirmed", "actual") of the data item, and (3) a DataValue (2330) that contains the numeric value for the DataItem. A ModelSpecification (2045) includes: (1) a VariableID that uniquely identifies the measurement variable; (2) a ModelDefinition (2340) class that describes the functional form of the model (e.g., polish postfix notation); (3) a ModelParameters (2050) class that specifies the parameter values to use for constants in the ModelDefinition (e.g., a and b in Eq. (1)), and (4) a ModelInputs class (2360) that relates variables in the ModelSpecification to DataItem in the measurement repositories (e.g., relates x(t−1)) to the last DataItem for the variable x).

FIG. 3A depicts examples of simple classes used as inputs to and outputs from the methods herein described. An Accuracy (3010) class quantifies how close a predicted value must be to the observed value. This could be unit-less (e.g., a percent), an absolute value, or something else. The classes: Boolean (3020); ElapsedTime (3040) (a time value); and ObjectID (3050) are well known to those skilled in the art. The class HeartBeatInterval (3060) has a well understood data type—a time value—which is used to express the interval between confirmation messages sent from the managed system (125) to the manager (120). The classes: SampleInterval (3110); and Timestamp (3120) are time values. The TimerID (3130) is a handle used in the Timer class. The Void (3150) class is used to indicate that no class is defined.

Having introduced exemplary classes in the present embodiment, their operation will now be discussed. The methods required for the DataItem and ModelDefinition classes, and the classes depicted in FIG. 2A and FIG. 3A include: constructors, setting a value, and getting a value. Such methods are straight forward to implement and so are not considered further.

FIGS. 3B, and 4–10 depict examples of methods for additional classes. For the most part, the logic of these methods is straight forward. Where this is not the case, elaboration is supplied in the description of the method or in the scenarios presented later on.

FIG. 3B depicts an example of a method in the Application class. As depicted, there is only one: notify( ). The notify( ) (30010) method is invoked to inform an Application object of a change in a measurement variable to which the object has subscribed. The behavior is specific to the application, as in the example depicted in FIG. 1A.

FIG. 4 depicts examples of methods used in the ManagerProtocolHandler class (2030). The concurrrentUpdate( ) (4005) method is invoked when a measurement variable is updated by another protocol handler. More detail is provided in the ConcurrentUpdate scenario, discussed later. The createModel( ) (4010) method constructs an in-storage representation of the ModelSpecification (2045) object. This can be implemented as an expression tree (see FIG. 6B), which is well known art (e.g., Aho and Ullman, 1972). A getDataReply( ) (4020) method is invoked when a measured value is supplied to the Manager ProtocolHandler (2030) through the MBM protocol. The getDataReply( ) (4020) method updates the ManagerMeasurementRepository (2020). A heartBeat( ) (4030) method is invoked when a heart-beat message is received from the managed system (125), in which case the status of the variable in the heart-beat message is changed from "tentative" to "confirmed". A modelUpdateRequest( ) (4040) method is used to request an update of the model for the variable. The modelUpdateReply( ) (4050) method is invoked when the AgentProtocolHandler (2080) sends a model update, in which case the ManagerModelHandler (2030) is called to change its model. The subscribe( ) (4060) method is invoked to request an MBM subscription to a measurement variable. A timerExpiration( ) (4070) method is invoked to provide periodic updates of the ManagerMeasurementRepository (2020) for a measurement variable. This is done by creating a DataItem whose value is obtained from the ManagerModelHandler (via getPredictedValue( )) (FIG. 6) and whose StatusCode is "tentative." An unsubscribe( ) (4080) method removes the MBM subscription for a specified variable.

FIG. 5 depicts examples of methods in the AgentProtocolHandler (2080) class. The checkModel( ) (5010) method determines if the model for a specified variable is within any accuracy bounds which may have been specified in the subscription to the managed system. A concurrentUpdate( ) (5020) method notifies the managed system (125) that a non-MBM protocol handler has updated a DataItem for a subscribed-to measurement variable. A getModelConfirmationTime( ) (5030) method returns the time at which a specified variable was last confirmed to be within its accuracy bounds. This requires that the AgentProtocolHandler (2080) keep historical information on when the model's accuracy is checked. A getDataRequest( ) (5040) method obtains the current value of a specified measurement variable by requesting it from the appropriate AgentDataAccessFacility (2070). A subscribe( ) (5060) method is invoked when a manager subscribes to a specified measurement variable. The subscription can also include a specified: bound for the accuracy of the predicted values (Accuracy); interval for the heart beat message (HeartBeatInterval) confirming the specified accuracy; and an interval (SampleInterval) during which values are to be updated in the ManagerMeasurementRepository (2020). The timerExpiration( ) (5070) method checks the accuracy of the predictive model for a specified variable. The unsubscribe( ) (5080) method removes the subscription to a specified measurement variable.

FIG. 6A depicts examples of methods for the ManagerModelHandler (2040) class. An example of a createModel( ) (6010) method includes the steps of: extracting the ModelDefinition (2340), ModelParameters (2350), and ModelInputs (2360) from the ModelSpecification (2045); allocating storage; and then constructing an expression tree for the model. A deleteModel( ) (6020) method frees the storage allocated. A getPredictedValue( ) (6030) method invokes the model's expression tree for the specified values in the ManagerMeasurementRepository (2020) to obtain a predicted value at the Timestamp specified. An updateModel( ) (6040) modifies the expression tree in accordance with those elements of the argument ModelSpecification that have changed since the expression tree was created (or last updated).

Figure 6B:
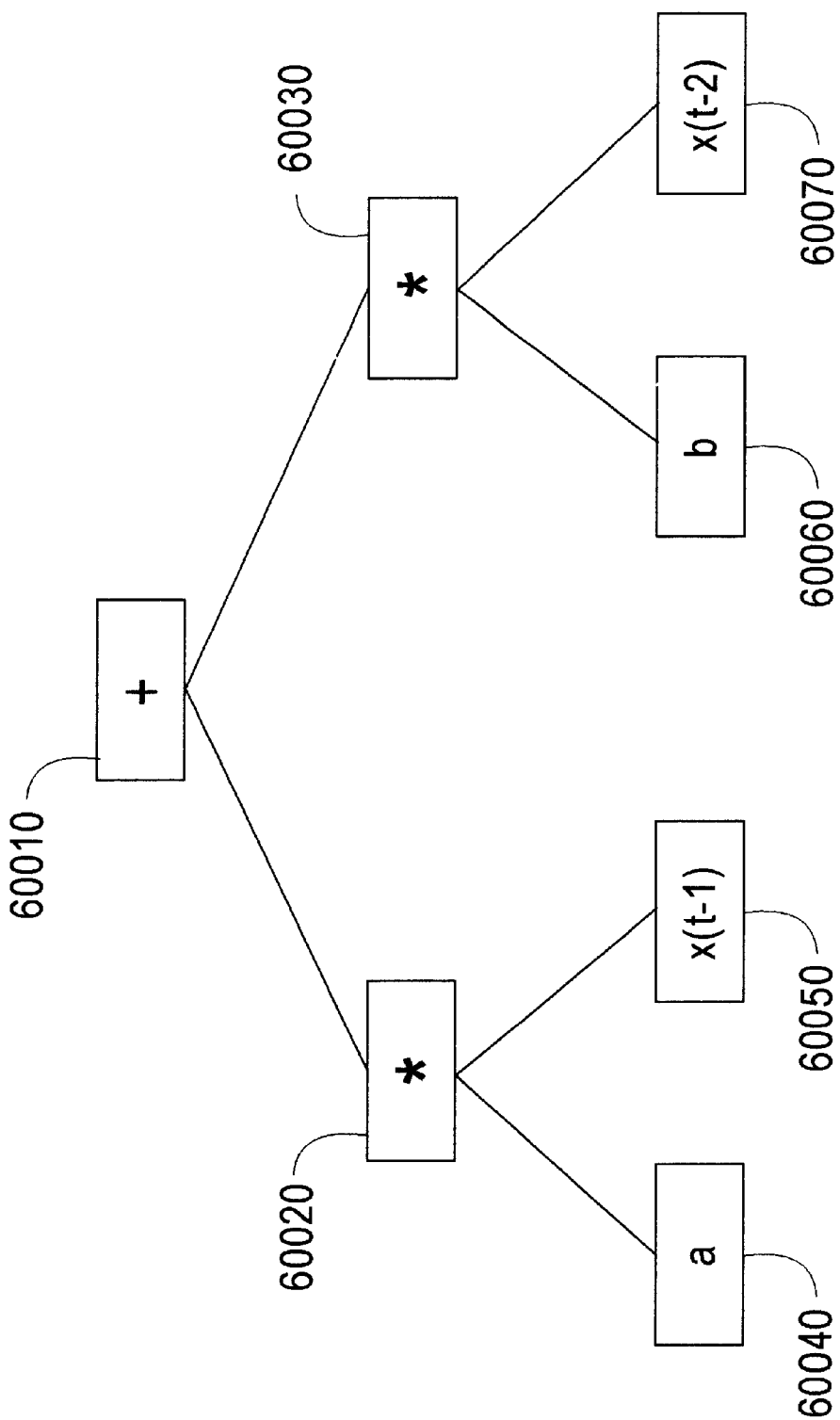
FIG. 6B depicts an example of an expression tree for Eq (1)

To elaborate, consider an example of an expression tree for Eq (1), depicted in FIG. 6B. As depicted, the leaves of the tree (at nodes 60040, 60050, 60060, and 60070) can be constants or variables. Each non-root node specifies how to combine results. In node 60020, it is specified that the value of a (in node 60040) should be multiplied by the value of $x(t-1)$ (in node 60050). In nodes 60030 and 60060, the same is specified for b (in node 60060) and $x(t-2)$ (in node 60070), respectively. In node 60010, The root specifies that the result produced by the subtree, rooted at node 60020, should be added to the result produced by the subtree rooted at node 60030.

An expression tree can be modified in several ways. One modification is to replace a term, such as changing $x(t-2)$ (in node 60070) to $x(t-3)$. Another modification is to add an expression subtree. For example, consider a model update that changes Eq (1) to the following:

$$x(t)=a^*x(t-1)+b^*x(t-2)+d^*x(t-4) \quad \text{Eq (1')}$$

Updating the expression tree in FIG. 6B to correspond to Eq (1') can be accomplished using the following steps: (a) add to node 60010, another child that specifies a multiply operation; (b) add two children to this new child such that one corresponds to d and the other corresponds to $x(t-4)$. Still another modification is to delete a subtree from the expression tree. For example, if the term $a^*x(t-1)$ is removed from Eq (1), then we should delete the subtree rooted at node 60020 from the expression tree in FIG. 6B.

FIG. 7 depicts examples of methods for the AgentModelHandler (2090) class. A defineModel( ) (7010) method performs model identification and parameter estimation (e.g., as in Box and Jenkins, 1976) to construct a model of a specified variable based on measurements in the AgentMeasurementRepository. Optionally, if a model with a specified accuracy value can be created, then an expression tree for the model is built and a non-null ModelSpecification (2045) object is returned. Otherwise, the ModelSpecification returned is null. A deleteModel( ) (7020) method deletes the model context information from the AgentModelHandler. A getPredictedValue( ) (7040) method returns an estimated value of a specified measurement variable based on the measured values in the AgentMeasurementRepository (2098) at a specified Timestamp.

FIG. 8 depicts examples of methods for the Timer (2050) object. The deleteTimer( ) (8010) method deletes a specified timer. The resetTimer (8020) resets a specified timer at a specified elapsed time value (ElapsedTime). A setTimer( ) (8030) method sets a specified timer at a specified elapsed time value (ElapsedTime). These methods (or their equivalents) are well known to one versed in the art.

FIG. 9 depicts examples of methods for the AgentDataAccessFacility (2070). A getValue( ) (9010) method retrieves a value for a specified measurement variable. A startCollection( ) (9020) method triggers the start of collection of values for a specified measurement variable. A stopCollection( ) (9030) method triggers the end of collection of values for a specified measurement variable. These methods (or their equivalents) are also well known to one versed in the art.

FIG. 10 depicts examples of methods in the ManagerMeasurementRepository (2020). Observe that a corresponding DataItem (2095) object is uniquely identified by the value of its VariableID and its Timestamp. A deleteVariable( ) (10005) method eliminates all DataItem in the ManagerMeasurementRepository with the VariableID specified. A getStatusCode( ) (10010) method retrieves the StatusCode of the corresponding DataItem. A getValue( ) (10020) method obtains the DataValue of a corresponding DataItem. An updatevalue( ) (10030) method creates a new DataItem for the VariableID and Timestamp specified, if such a DataItem does not exist already. Otherwise, the DataItem's DataValue and/or StatusCode are changed to that of the parameters specified in the arguments of the method. A putValue( ) (10040) method creates a new DataItem and sets its StatusCode to "actual". This method is the only way that non-MBM MAPs add DataItem to the ManagerMeasurementRepository. As such, this method provides a way for the ManagerProtocolHandler (2030) to be notified of concurrent updates to measurement variables. A subscribe( ) (10060) method specifies: the variable for which a managed system desires a subscription; a desired accuracy bound of the variable; the heart-beat interval for which confirmations are desired; the sample interval in which values are to be updated in the ManagerMeasurementRepository; and the object to be notified when such updates occur.

FIG. 11 depicts examples of methods in the AgentMeasurementRepository (2098). A deleteVariable( ) (11005) method eliminates all DataItem in the AgentMeasurementRepository with the VariableID specified. A getvalue( ) (11020) method obtains the DataValue for the DataItem (correpsonding to the VariableID and Timestamp). A putValue( ) (11040) method creates a new DataItem with a specified data value.

Figure 12:
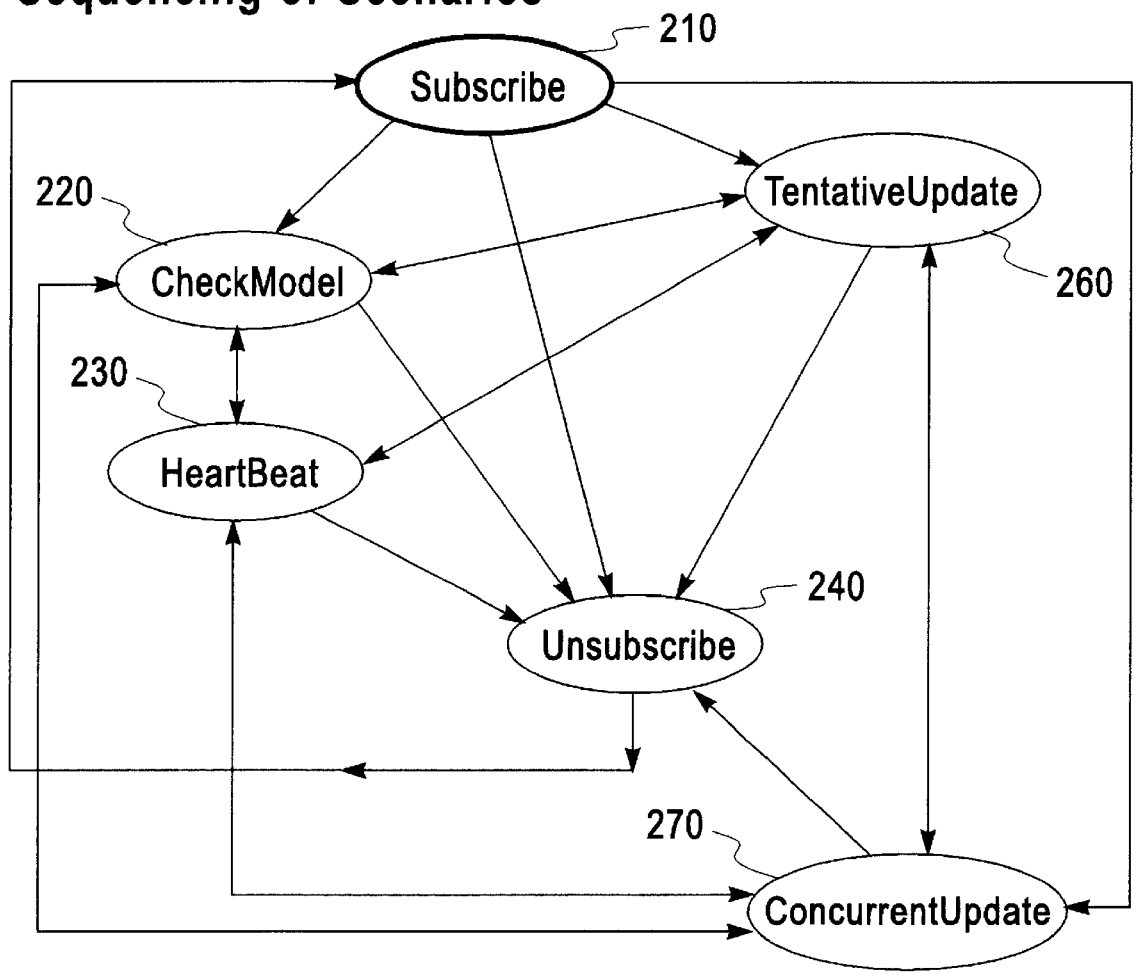
FIG. 12 depicts an example of a sequencing of scenarios in an MBM protocol.

FIG. 12 depicts several exemplary scenarios and their sequencing dependencies. A Subscribe scenario (210) occurs when an Application (100) uses MBM to subscribe to a measurement variable, thereby enabling the use of predictive models that provide tentative updates. The CheckModel scenario (220) describes how predictive models can be are checked for accuracy and the actions taken when the accuracy is below what is expected. The HeartBeat scenario (230) illustrates how periodic heart-beat messages can be used to provide the manager with confirmations of tentative values. The Unsubscribe scenario (240) details how subscriptions can be revoked by an Application (100). The ConcurrentUpdate scenario (270) shows how other MAPs can update measurement Variables concurrently. The TentativeUpdate scenario (260) shows how tentative updates can be constructed and posted into the ManagerMeasurementRepository. Note that the Subscribe scenario must occur before any of the others. Indeed, the darkened oval indicates that this scenario is the starting point. Also, note that the scenarios CheckModel, HeartBeat, ConcurrentUpdate, and TentativeUpdate can occur in any order with respect to one another.

In the sequel, scenarios are presented as Booch object interaction diagrams. Objects are indicated by their class name. This appears at the top of the diagram. If there are multiple objects of the same class, then a suffix is added. The class of each object appears at the top of the diagram. The relative time at which interactions occur proceeds from top to bottom. Interactions take the form of method invocations, with the arrow pointing from caller to the call-ee. With the exception of the StatusCode class, arguments and return values are not specified. Processing within a method is indicated by an arrow that is shaped like a backwards letter "c."

Figure 13:
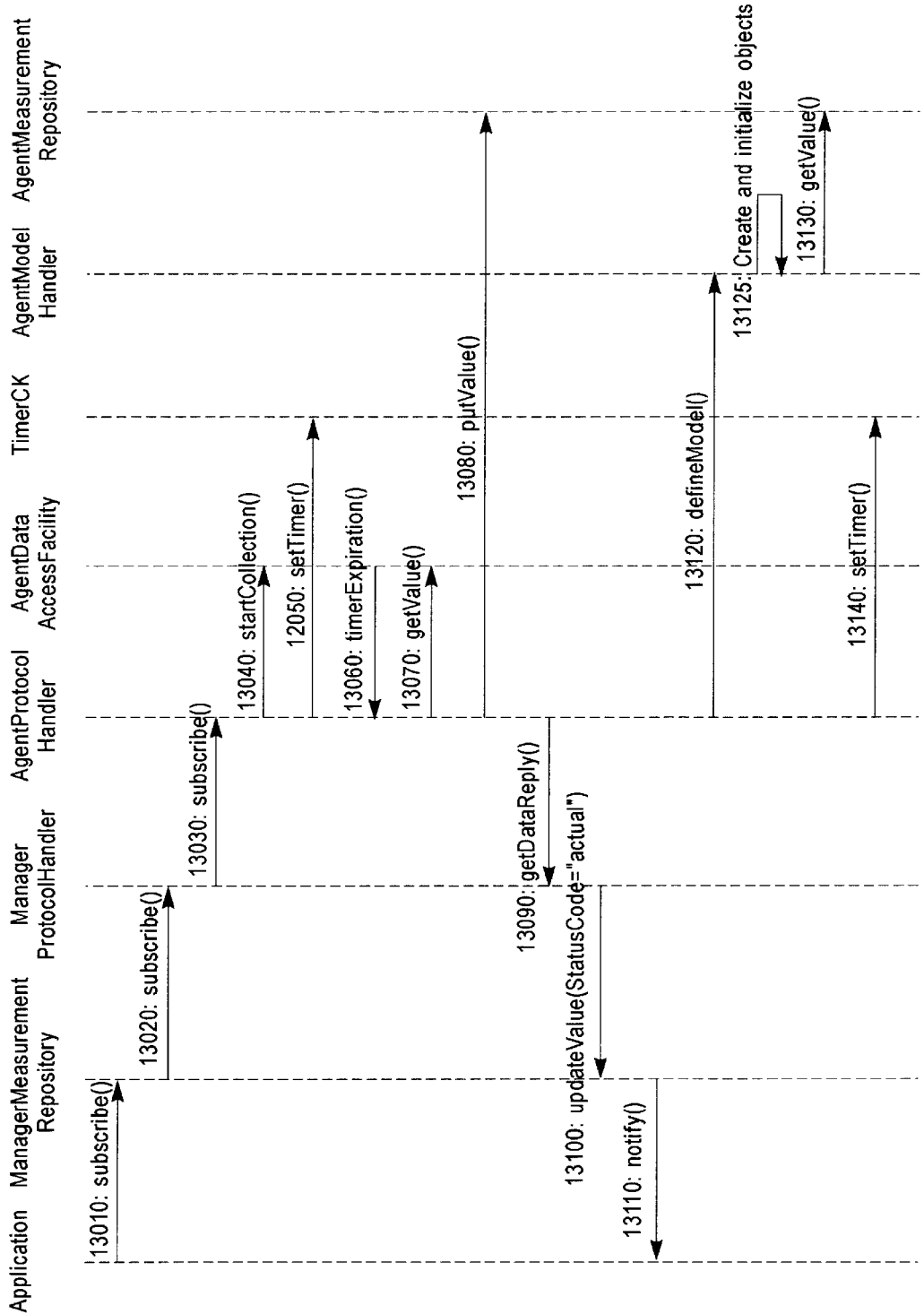
FIG. 13 depicts an example of a first part of the MBM Subscribe scenario.

FIG. 13 depicts an example of the first part of the Subscribe scenario (210). As depicted, in steps 13010, 13020 and 13030, the subscription request is propagated from the Application (2010), to the ManagerMeasurementRepository (2020), to the ManagerProtocolHandler (2030), and then to the AgentProtocolHandler (2080). In steps 13040, 13050, 13060, 13070 and 13080, data collection is begun on the managed system (125) and the AgentMeasurementRepository (2098) is updated. In steps 13090, 13100, and 13110, the manager (125) receives the values of measurements obtained from the managed system, places them in the ManagerMeasurementRepository (with a StatusCode of "actual"), and notifies the Application that the data are present. In steps 13120, 13130 and 13140, the AgentProtocolHandler (2080) attempts to define a model of the subscribed-to variable. In this scenario, insufficient data exist to construct a ModelSpecification (2045), and so a null value is returned from the defineModel( ) method (7010). Also, note that within the defineModel( ) method invoked in (13120), objects are created within the Agent Model Handler (13125).

Figure 14A:
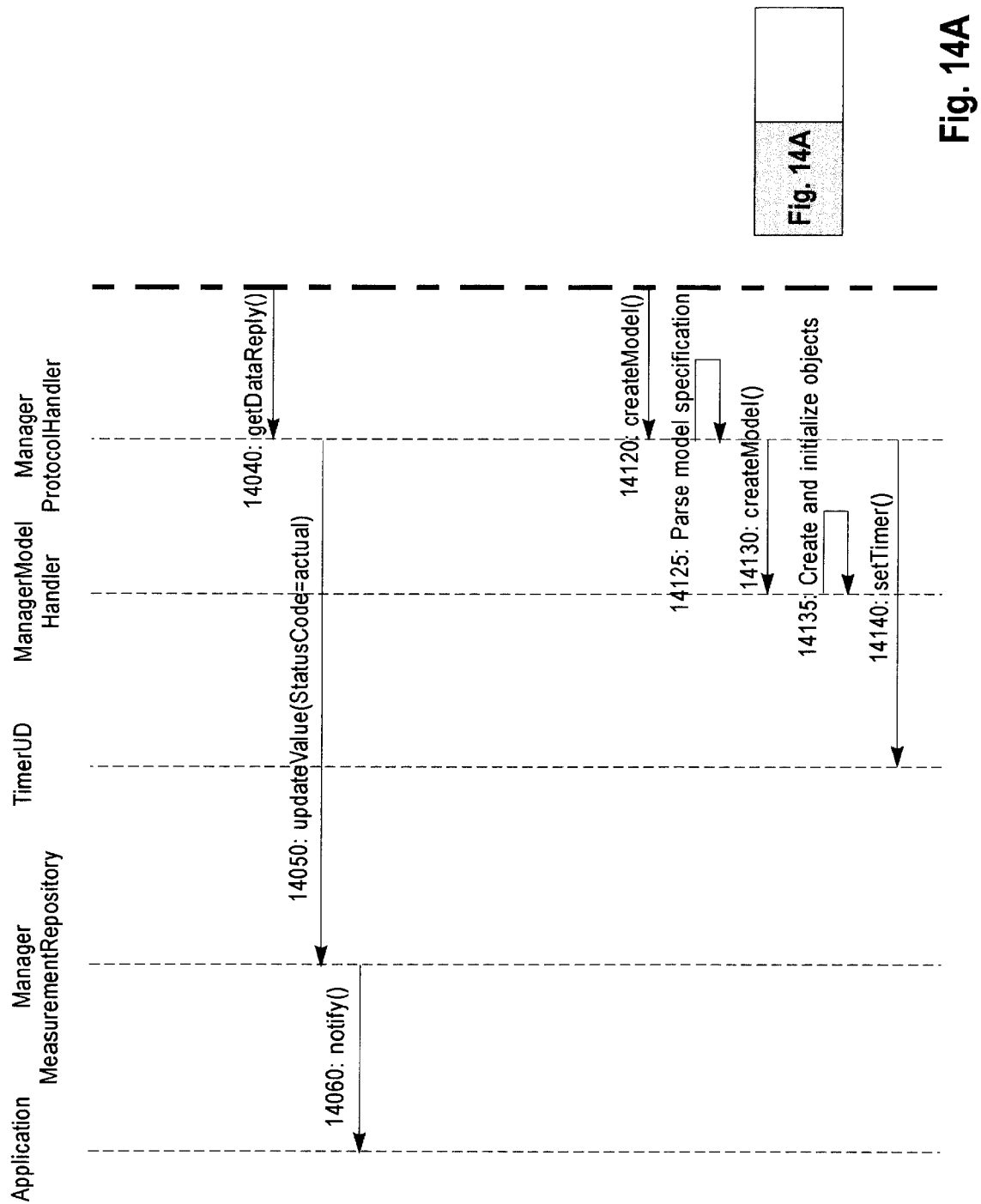
FIGS. 14A and 14B depict an example of a second part of the MBM Subscribe scenario.
Figure 14B:
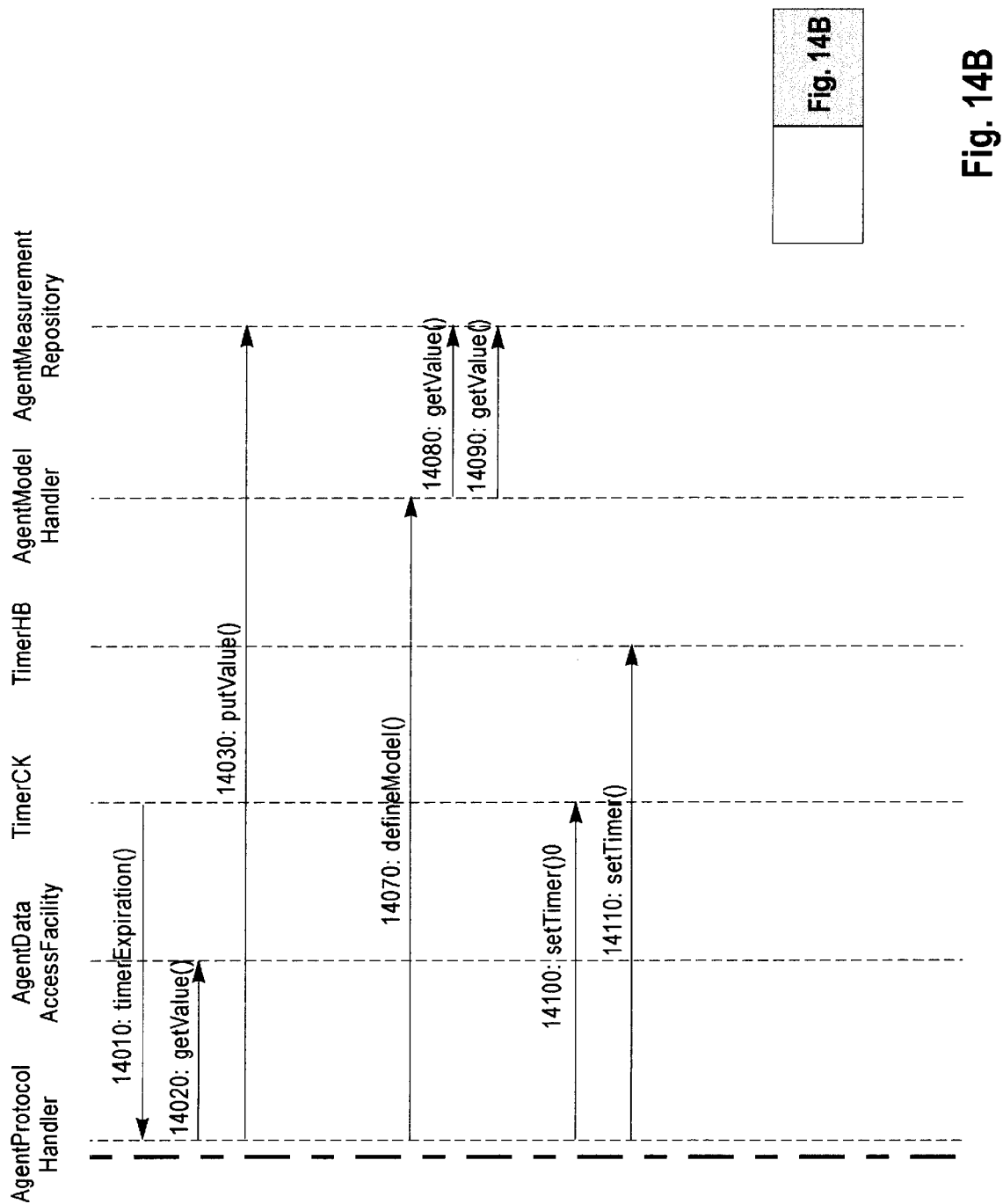

FIGS. 14A and 14B depict an example of the second part of the Subscribe scenario. As depicted, in step 14010, the scenario is initiated by the expiration of a check model timer (TimerCK). (Recall that TimerCK is set in FIG. 13 in (12050), it is set again in (14100).) In steps 14020 and 14030, the managed system obtains another value of the measurement variable for which the subscription has been initiated. In steps 14040, 14050 and 14060: the manager (120) receives the values of measurements obtained from the managed system (125); places them in the ManagerMeasurementRepository (2020) (with a StatusCode of "actual"); and notifies the Application (2010) that the data are present. In steps 14070, 14080, and 14090: the AgentProtocolHandler (2080) defines a model for the variable for which the subscription is done. As depicted, two data values are sufficient to define the model, although in practice more data may be required. In step 14100, a timer is set (TimerCK) to trigger periodic accuracy checking of the of the model. In step 14110 another timer (TimerHB) is set, to trigger periodic heart-beat messages. In steps 14120 and 14130, the model of the variable is communicated to the manager, and the ManagerModelHandler (2040) creates the expression tree for this model. In step 14140, a timer (TimerUD) is set so that the ManagerMeasurementRepository is updated periodically. Note that during the execution of the createModel( ) (14120) method in the Manager Protocol Handler, the string form of the model specification received from the managed system is parsed (14125) and an object representation (as in FIG. 2A) is created. Further, during the execution of the createModel( ) method (14130) in the Manager Model Handler, objects are created and initialized (14135).

Figure 15:
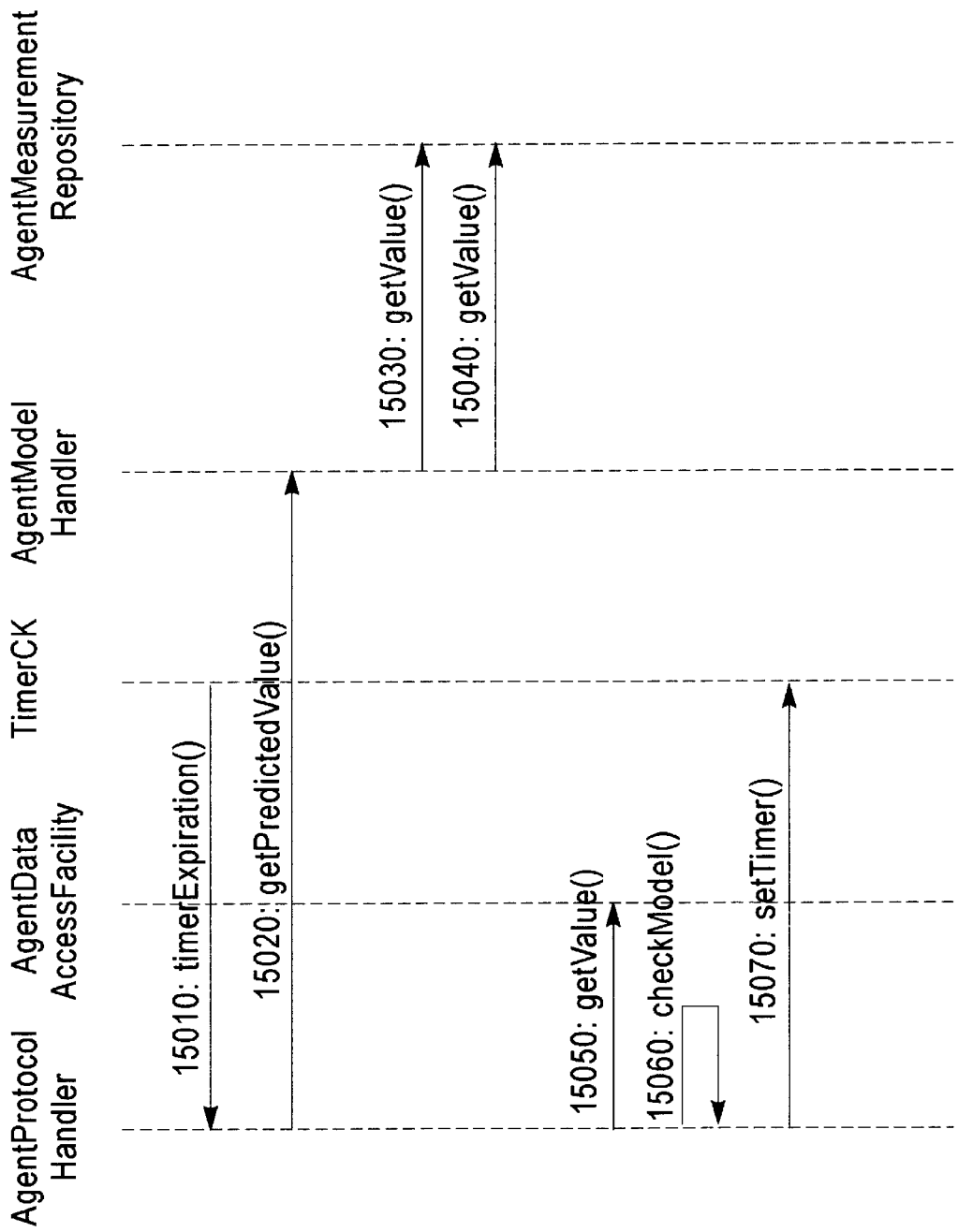
FIG. 15 depicts an example of a CheckModel scenario when the model is within its accuracy bounds.

The CheckModel scenario is organized into two subcases. FIG. 15 depicts an example of interactions when the predictive model is found to be within the accuracy limits specified on the subscription message. As depicted, in step 15010, the scenario is initiated by the expiration of the check-model Timer (TimerCK). In steps 15020, 15030) and 15040: the predicted value of the measurement variable is obtained using getvalue( ) in (15030) and (15040). In step 15050, the actual value is obtained from the Agent Data Access Facility (135). In step 15060, the two values are compared and found to be sufficiently close. In step 15070, the timer (TimerCK) is set so that periodic checking continues.

Figure 16:
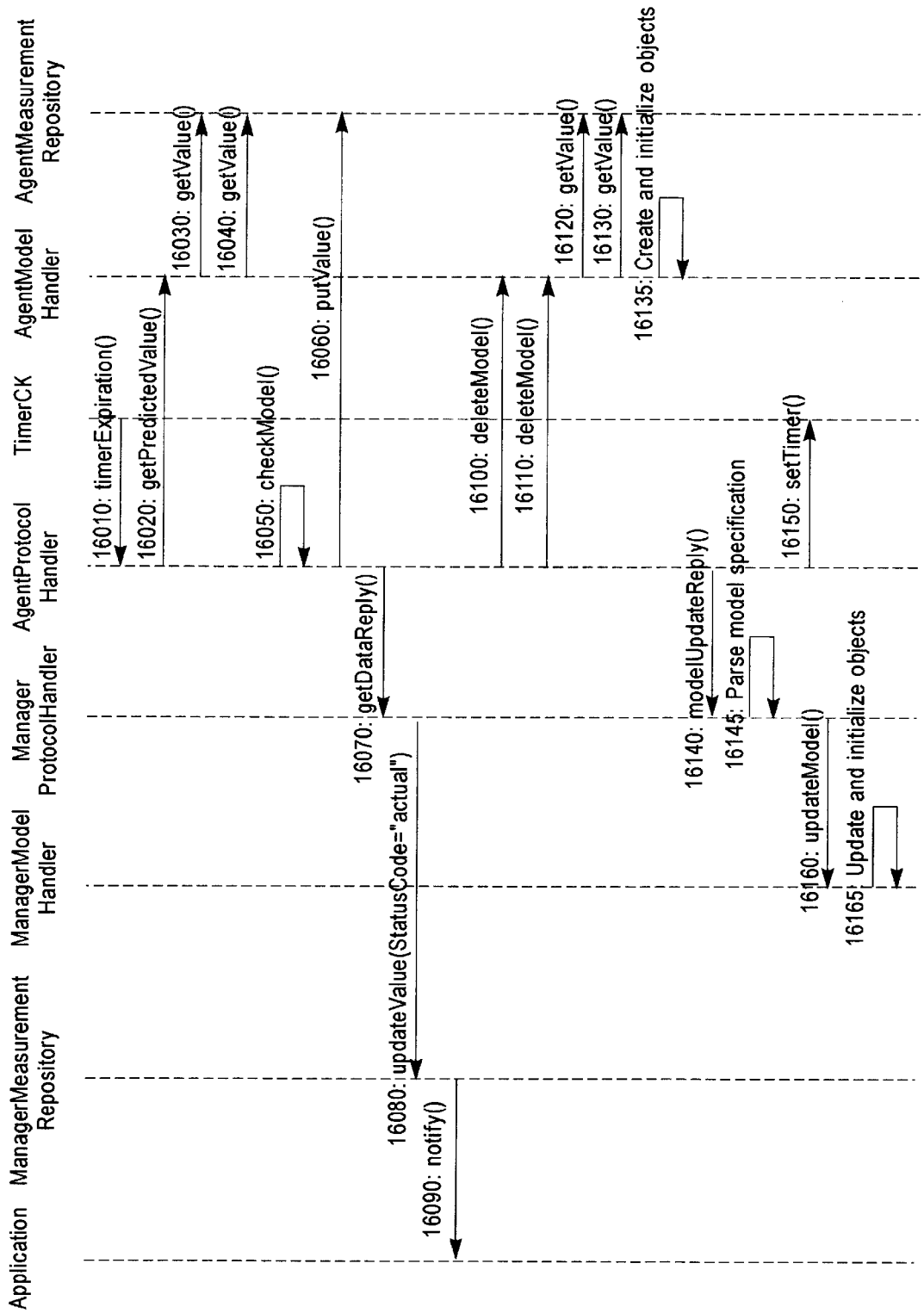
FIG. 16 depicts an example of a CheckModel scenario when the model is not within its accuracy bounds.

FIG. 16 depicts an example of the CheckModel scenario when the model is found not to be sufficiently accurate. As depicted, in step 16010, the scenario is initiated by the expiration of the check-model timer (TimerCK). In steps 16020, 16030, and 16040: the expected and actual value of the measurement variable are obtained. In step 16050, the model is checked and found to be insufficiently accurate (not within a specified accuracy bound). In steps 16060, 16070, 16080, and 16090: the AgentMeasurementRepository and ManagerMeasurementRepository are updated with the most current values. Note that in step 16080 the ManagerMeasurementRepository is updated with a StatusCode of "actual". In steps 16100, 16110, 16120, 16130 and 16140: the current model is deleted; a new model is constructed; and sent to the manager. In step 16150, a timer (TimerCK) is set so that periodic model checking continues. In step 16160, the manager processes the updated model. Note that during the execution of the defineModel( ) method (step 16110) of the Agent Model Handler, objects are created and initialized (step 16135). Also, during the execution of the modelUpdateReply( ) method (step 16140), the string form of the model specification received from the managed system is parsed and an object representation of the model specification (as in FIG. 2B) is created. Further, during the execution of the updateModel( ) method (step 16160) of the Manager Model Handler, objects are updated and initialized (step 16165).

Figure 17:
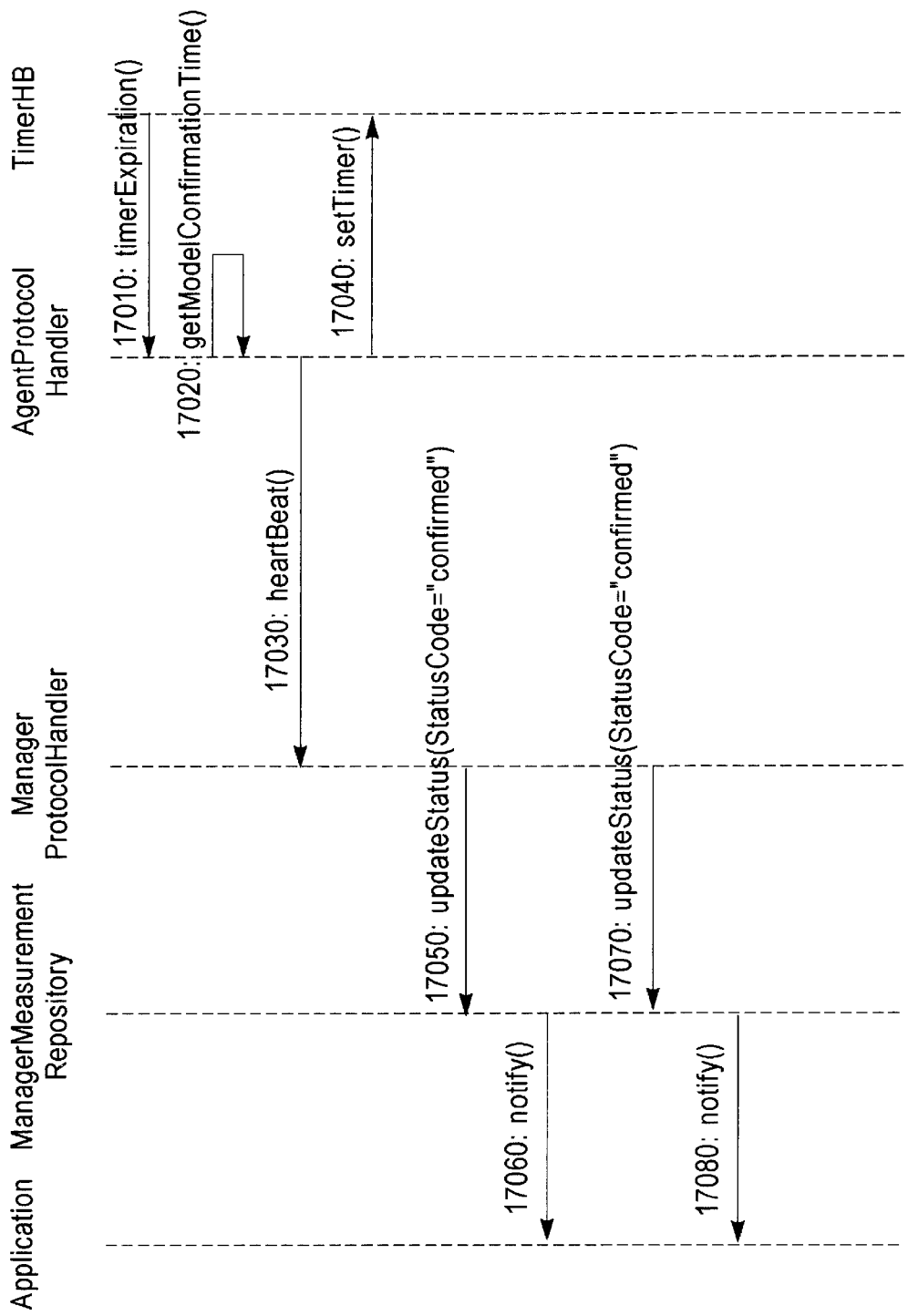
FIG. 17 depicts an example of a HeartBeat scenario.

FIG. 17 depicts an example of interactions for the HeartBeat scenario. As depicted, in step 17010, the heart-beat timer expires, which initiates the scenario. In step 17020, the AgentProtocolHandler (2080) obtains the time at which the model of the measurement variable was last confirmed. In step 17030, the heart-beat message is sent to the manager. In step 17040, a timer (TimerHB) is set so that this scenario will be repeated periodically. In steps 17050, 17060, 17070 and 17080: the ManagerMeasurementRepository (2020) is updated with a StatusCode of "confirmed"; and the Application is notified of the status change. Note that a single heart-beat message can result in updating multiple DataItem objects since these correspond to values of a measurement variable at different time stamps, all of which are confirmed by the heart-beat message.

Figure 18B:
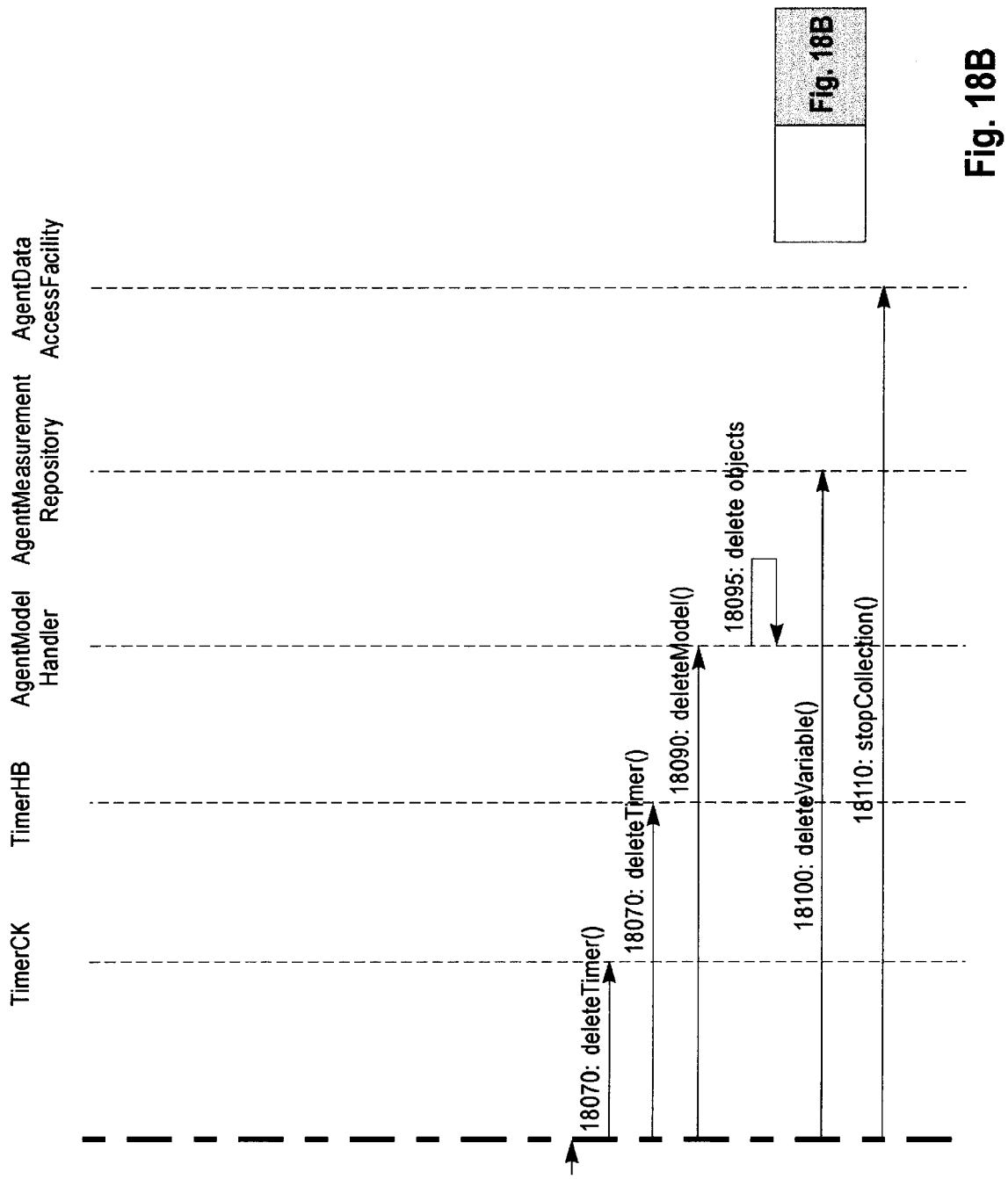

FIGS. 18A and 18B depict an example of interactions for the Unsubscribe scenario. As depicted, in step 18010, an Application (100) initiates the revocation of subscription. In step 18020, the ManagerMeasurementRepository (2020) removes all DataItem objects for the specified measurement variable. In steps 18030, 18040 and 18050, the timer and model for the measurement variable are deleted on the manager (120). In step 18060, the managed system (125) is informed that the subscription is revoked. In steps 18070, 18080, 18090, 18100 and 18110, the managed system (125) deletes: the timers; the repository entries; and the collection tasks associated with the specified measurement variable. Note that during the execution of the deleteModel( ) method (step 18050) of the Manager Model Handler, objects are deleted (step 18055). Also, during the execution of the deleteModel( ) (step 18090) of the Agent Model Handler, objects are deleted (step 18095).

Figure 19:
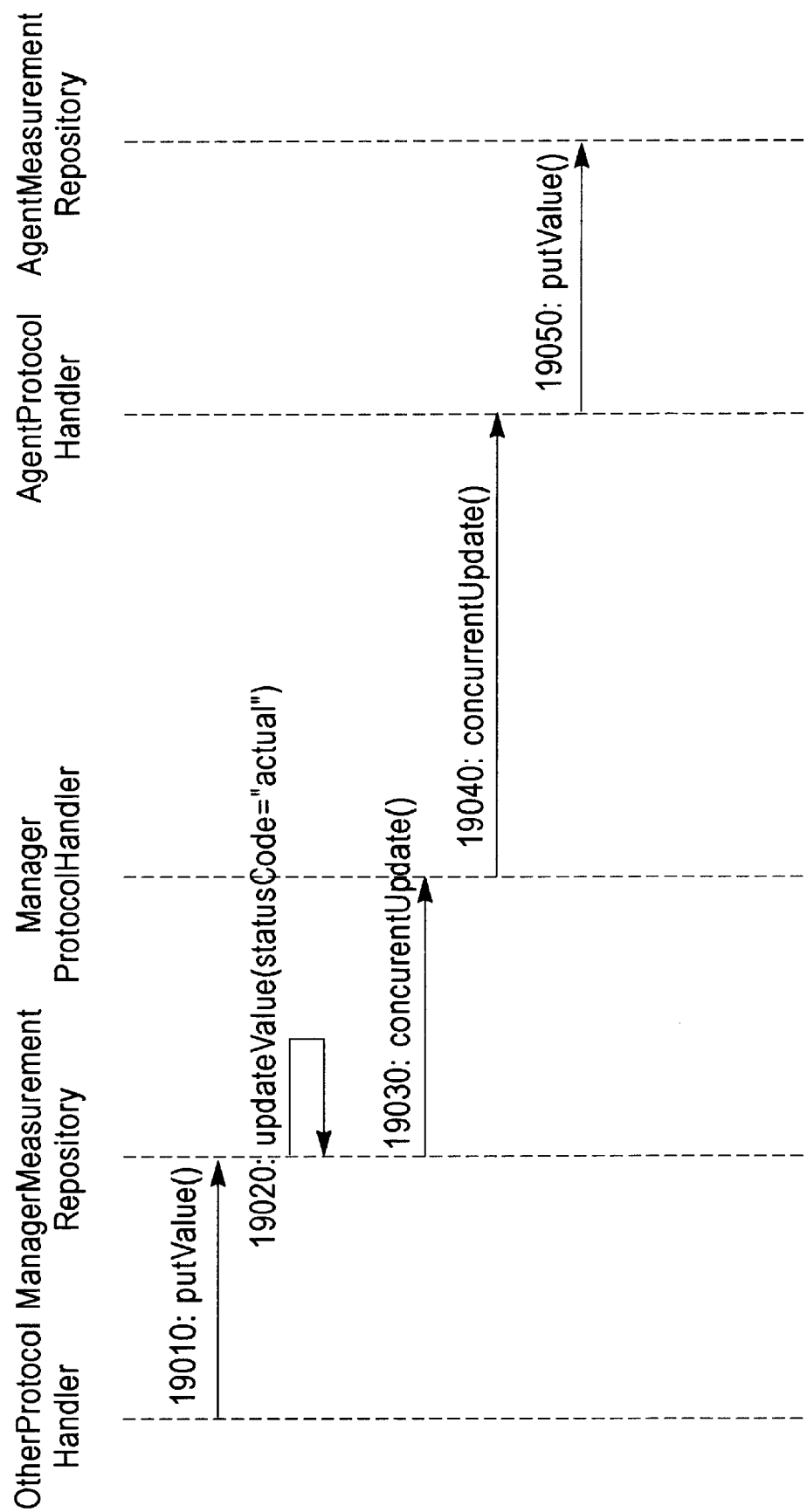
FIG. 19 depicts an example of a ConcurrentUpdate scenario.

FIG. 19 depicts an example of the ConcurrentUpdate scenario. This refers to a situation in which a non-MBM protocol is being used concurrently with MBM. For simplicity, not all of the architectural components of this non-MBM protocol are shown, just the element on the manager (120) that updates the ManagerMeasurementRepository (2020). (Clearly, there must be at least one component on the managed system (125) as well.) As depicted, in step 19010, the, non-MBM MAP (OtherProtocolHandler) updates the ManagerMeasurementRepository using the putValue( ) method. In step 19020, the putValue( ) method invokes the updatevalue( ) method with a StatusCode of "actual". In step 19030 and 19040: the ManagerProtocolHandler (2030) is informed of the concurrent update, which in turn informs the AgentProtocolHandler (2080). In step 19050, the AgentMeasurementRepository (2098) is updated.

Figure 20:
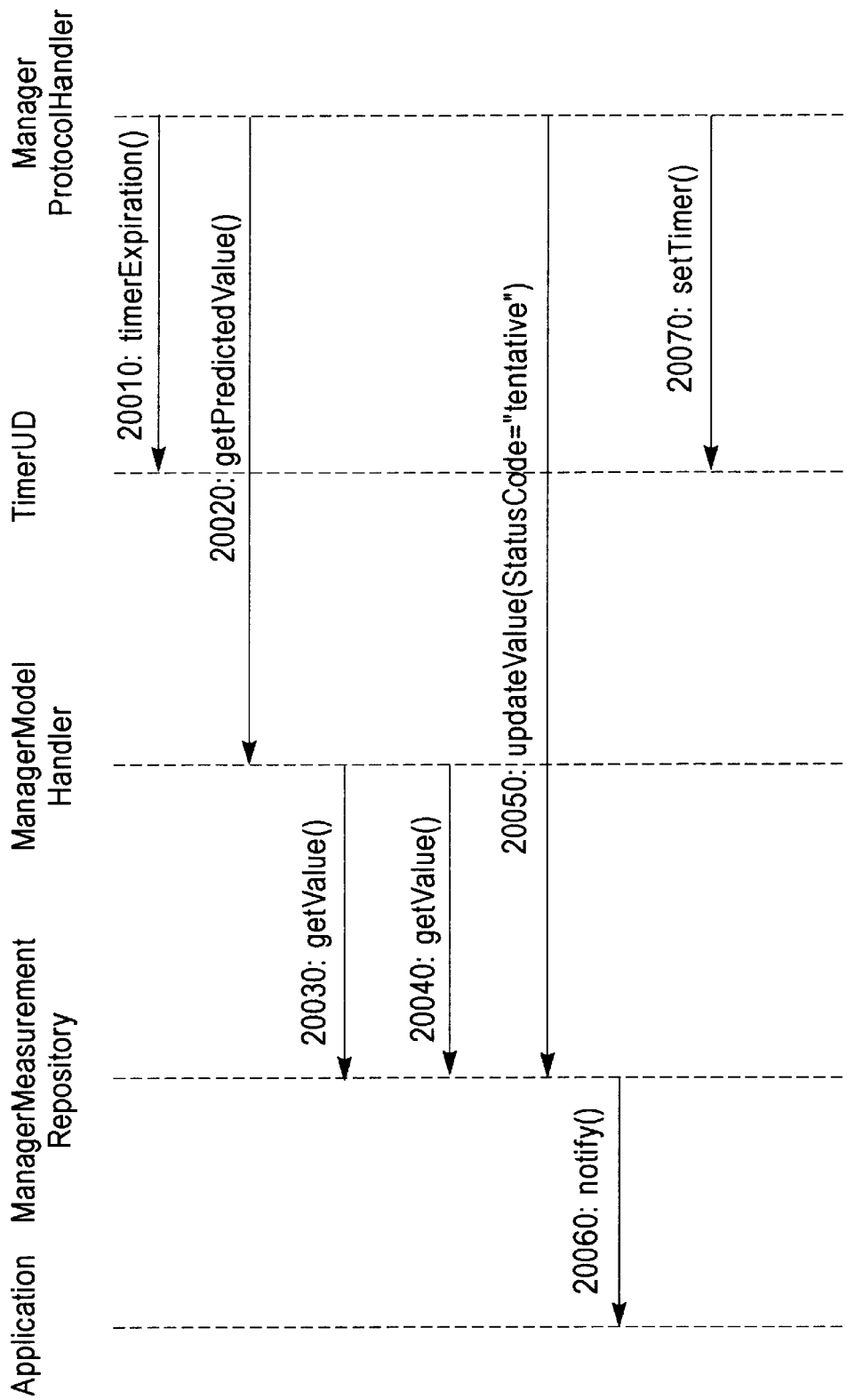
FIG. 20 depicts an example of a TentativeUpdate scenario.

FIG. 20 depicts an example of the TentativeUpdate scenario. As depicted, in step 20010, the scenario is initiated by the update timer expiration (TimerUD) on the manager (120). In steps 20020, 20030, and 20040: the predicted value of the measurement variable is obtained. Note that no actual values are obtained from the managed system in this scenario since we are only considering the use of tentative values by the Application (100). In step 20050, the ManagerMeasurementRepository (2020) is updated with a StatusCode of "tentative". In step 20060, the Application is notified that a new value is available. In step 20070, the update timer is set so that the scenario can be repeated.

One difficulty in practice with the proposed embodiment is that the manager must predict values at time stamps that are determined by the clock on the managed system, but the manager and managed systems may not have synchronized clocks. This can be addressed by using a relative time stamp that indexes a set of sampling intervals. For example, a three could be used to identify the third sampling interval. This approach only requires that clocks operate at the same rate.

Another consideration in practice is handling memory management of DataItem objects that are created in the measurement repositories (on the manager (1110) and managed (170) systems). To one versed in the art, knowledge of memory management schemes is common, such as only allowing a fixed amount of history or providing installation controls to establish specific policies.

Various efficiency improvements are possible in the embodiment herein described. First, in the CheckModel scenario depicted in FIG. 16, updating the predictive model on the managed system is accomplished by deleting the existing model and defining a new model. However, within the spirit and scope of the present invention, some efficiencies can be gained by doing incremental adjustments to the model, thereby avoiding overheads such as releasing and re-allocating storage.

A second efficiency is to extend the embodiment to address groups of measurement variables. With this extension, the StatusCode and Timestamp objects refer to a set of measurement variables and their values. To one skilled in the art, this is relatively straight forward since it only requires modest adjustments to the parameters passed in method calls and to the objects used inside these methods.

Another variation of the present invention is to eliminate the StatusCode of "confirmed" by including in the heart-beat message the values of the confirmed DataItem objects. This approach simplifies the design somewhat. It also simplifies the user interface for management applications such as that described in FIG. 1A. The main disadvantage of this approach is that message sizes can increase considerably if there is a long delay between heart-beat messages and/or a large number of measurement variables are acquired using MBM. Again, to one skilled in the art, this variation is straight forward to implement.

Another straight forward extension to the present invention is to have multiple managers for a single managed system. Doing so requires that DataItem in the AgentMeasurementRepository (2098) and ModelSpecifications (2045) in the AgentModelHandler (2090) be indexed by manager so that the AgentProtocolHandler (2080) can determine if the manager's predictions are within the accuracy bounds specified by the subscription.

Yet another fairly easy extension to the present invention is to use heart-beat messages to determine if a managed system is severely impaired. That is, the manager uses a second Timer object for each variable (or variable group) to provide a notification of when a heart-beat message is expected. If the message does not arrive, then a notification is sent or an action is taken to address a potential problem with the managed system.

Last, it is observed that one approach to handling concurrent updates (FIG. 19) by other MAPs generates a message (143) from the manager to the managed system. This is done so that other MAPs need not be aware of the MBM protocol. If this restriction is removed, then it can be required of other MAPs to: (a) inform the AgentProtocolHandler when data are obtained; and (b) inform the ManagerProtocolHandler when the update is posted. With this approach, the number of messages exchanged is reduced.

Yet another alternative is to consider predictive models that are present only on the manager system (120). This may arise, for example, when there is a single controller that is doing load balancing across diverse systems (e.g., a workstation and a supercomputer) and hence the controller needs to model the systems to which jobs are sent in order to estimate their load levels. Note that this alternative still requires model specifications that consist of a model definition, parameter values, and input data.

Still another alternative is that the predictive models (141) are present only on the managed system (125). Indeed, it may be that the managed system is a standalone system. Such an implementation provides a way to more effectively manage resources. In the current state-of-the-art, thresholds are used to control resource consumption so that catastrophic conditions are avoided. For example, in a router, excessive CPU consumption can deprive the router of processing needed to support basic kernel services. Thus, there is typically an upper limit specified on the CPU that can be consumed by nonessential processes. This limit is typically set sufficiently low to accommodate a variety of circumstances, such as different kinds of message processing. As a result, the limit is often too low for some kinds of message traffic, and it may be too high for others. By having a predictive model that can forecast future values of CPU consumption, it is possible to employ a more efficient approach to resource management in which the threshold depends on predicted values. Hence, the effective upper limit for CPU consumption will be higher when the traffic is less demanding and lower when the traffic is more demanding. Note that this embodiment still requires model specifications that consist of a model definition, parameter values, and input data.

Now that the invention has been described by way of a preferred embodiment, with alternatives, various modifications and improvements will occur to those of skill in the art. Thus, it should be understood that the detailed description should be construed as an example and not a limitation. The invention is properly defined by the appended claims.

The following references are hereby incorporated herein by reference in their entirety:

A. V. Aho and J. D. Ullman, *The Theory of Parsing, Translation, and Compiling*, Prentice-Hall, 1972.

R. F. Berry and J. L. Hellerstein, "A Flexible and Scalable Approach to Navigating Measurement Data in Performance Management Applications," Second IEEE Conference on Systems Management, Toronto, Canada, June, 1996.

G. Booch, *Object-Oriented Analysis and Design*, The Benjamin/Cummings Publishing Company, Redwood City, Calif., 1994.

G. E. P. Box and G. M. Jenkins, *Time Series Analysis, forecasting and cotrol*, Prentice Hall, 1976.

T. M. Cover and J. A. Thomas, *Elements of Information Theory*, John Wiley & Sons, Inc., 1991.

B. Gaddouna et al., "Fault Detection Observers for Systems with Unknown Inputs," Proceedings of Fault Detection, Supervision, and Safety for Technical Processes, June 13–16, pp. 59–64, 1994.

M. J. Freeley et al., "Implementing Global Memory Management In a Workstation Cluster," Fifteenth AC Symposium on Operating Systems Principles, pp. 201–212, 1995.

N. Hachem and S. Chenye Bao Taylor, "Approximate Query Answering in Numerical Databases," 8th International Conference on Scientific and Statistical Data Base Management, pp. 63–73, 1996.

C. Hood and C. Ji, "Automated Proactive Anomaly Detection," Proceedings of Integrated Network Management, pp. 688–699, 1997.

M. Litzkow, M. Livny, and M. Mutka: "Condor—A Hunter of Idle Workstations," The 8th International Conference on Distributed Computing Systems, pp. 104–111, 1988.

R. Maxion, "Anomaly Detection for Diagnosis," 20th IEEE Conference on Fault Tolerant Computer Systems, pp. 20–27, June, 1990.

D. Mils, "Network Timer Protocol Specification and Implementation," Network Working Group Request for Comments: 1119, September 1989.

M. B. Priestley, *Spectral Analysis and Time Series*, Academic Press, 1981.

S. Tanenbaum, *Computer Networks*, Prentice Hall, 1996.

What is claimed is:

1. A predictive model-based method for measurement data acquisition in a distributed system, comprising the steps of:

dynamically constructing a predictive model, based on one or more non-static measurement variable values, on both a manager system and a disconnectable managed system;

operating the predictive model on both the manager system and the managed system; and the manager system processing requests for the measurement variable values based on the predictive model on the manager system.

2. The method of claim 1, further comprising the steps of:

the disconnectable managed system determining that the predictive model is insufficiently accurate; and the disconnectable managed system constructing and communicating an updated predictive model to the managed system, in response to said determining.

3. The method of claim 2, further comprising the step of, the managed system disconnecting from the managed system except to update the predictive model.

4. The method of claim 1, further comprising the step of communicating a measurement variable subscription request for a predictive model from the manager system to the managed system, wherein the predictive model is constructed in response to the subscription request.

5. The method of claim 1, further comprising the step of:

the managed system disconnecting from the managed system;

the managed system measuring one or more actual values of the measurement variables and comparing the actual value against an accuracy bound;

if the actual values are within an accuracy bound associated with the predictive model on the managed system: the managed system connecting and communicating a message to the manager system confirming that the actual values are within the accuracy bound; and if the actual values are not within the accuracy bound associated with the predictive model on the managed system: the managed system constructing an updated predictive model; and connecting and communicating the updated predictive model to the manager system.

6. The method of claim 1, further comprising the steps of:

the managed system measuring one or more actual values of the measurement variables and comparing an actual value against an accuracy bound; and confirming and communicating a message to the manager system indicating the one or more actual values are within an accuracy bound.

7. The method of claim 6, further comprising the steps of:

the manager system associating said measurement variable values with one or more status codes indicating how they were obtained; and the manager system storing said measurement variable values and the status codes, in response to said associating.

8. The method of claim 7, further comprising the steps of:

the manager system identifying a measurement variable value status as tentative if the measurement variable value is a predicted value which has not been confirmed as within the accuracy bound; and the manager system changing the measurement variable value status from tentative to confirmed, in response to the message indicating the one or more actual values are within the accuracy bound.

9. The method of claim 7, further comprising the steps of:

the managed system measuring one or more actual values of said measurement variables;

the managed system communicating the actual values to the manager system; and the manager system identifying the measurement variable value status as actual if the actual values have been received.

10. The method of claim 1, wherein the system includes multiple managed systems that have one or more of different collection frequencies and unsynchronized clocks, said method further comprising the steps of:

said dynamically constructing including creating and associating a time stamp with a measurement variable value;

the manager system synchronizing data from the multiple managed systems, using the time stamp.

11. The method of claim 10, wherein said step of the manager system synchronizing data further comprises the step of adjusting a granularity of the time stamp using the predictive models.

12. The method of claim 10, wherein the unsynchronized clocks operate at a same rate, further comprising the step of:

the manager system predicting measurement variable values at sampling intervals based on a relative time stamp indexing a set of sampling intervals.

13. The method of claim 1, further comprising the step of:
the managed system and the manager system synchronizing the measurement variable values used as inputs to the predictive model.

14. The method of claim 1, further comprising the step of:
manager system applications requesting and using the predicted values of measurement variables without requiring actual values of these variables from the managed system.

15. The method of claim 1, in an object-oriented system, further comprising the steps of:
said dynamically constructing comprises serializing and communicating serialized predictive model objects on the managed system and reconstructing a same predictive model on the manager system based on the serialized predictive model objects.

16. The method of claim 1, further comprising the step of transparently running multiple measurement acquisition protocols concurrently in the system.

17. The method of claim 1, further comprising the step of: constructing and storing the predictive model as an expression tree.

18. The method of claim 1, further comprising the steps of:
the disconnectable managed system monitoring measured values and using the predictive model on the disconnectable managed system to detect excessive deviations of predicted values from measured values;
the disconnectable managed system communicating to the manager system updates to the predictive model if said excessive deviations are detected; and
the manager system updating its predictive model based on the updates.

19. The method of claim 1, further comprising the step of:
said dynamically constructing further comprises the step of dynamically creating the predictive model wherein the model includes a model definition, model parameters and model measurement variable inputs.

20. The method of claim 19, in an object-oriented system, said dynamically constructing further comprising the steps of:
the managed system communicating the predictive model to the manager system;
the manager system parsing the model definition, the model parameters, and the model inputs, in response to said communicating; and
the manager system creating and initializing objects for the model definition, the model parameters, and the model inputs.

21. A predictive model-based method for measurement data acquisition in a distributed system, comprising the steps of:
a manager application specifying measurement variables for which a subscription is requested;
a manager system communicating the subscription request and a desired accuracy of measurement variables to a managed system, in response to said specifying;
the manager system and the managed system storing measured values from the managed system, in response to the subscription;
the managed system creating and communicating a predictive model to the manager system, in response to said storing;
the manager system satisfying requests for measurement variable values using tentative predictive values from the predictive model on the manager system; and
the disconnectable managed system: periodically checking the accuracy of the tentative predictive values; communicating to the manager messages confirming the tentative predictive values that are within the desired accuracy; updating the predictive model if the tentative predictive values are not within the desired accuracy and communicating an updated predictive model to the manager system.

22. The method of claim 21, further comprising the step of:
the manager system receiving one or more actual measurement variable values from the measurement data access facilities on the managed system; and
identifying and storing the actual values on the manager system.

23. A program storage device readable by a machine, tangibly embodying a program of instructions executable by the machine to perform method steps for a predictive model-based method for measurement data acquisition in a distributed system, said method steps comprising:
dynamically constructing a predictive model, based on one or more non-static measurement variable values, on both a manager system and a disconnectable managed system;
operating the predictive model on both the manager system and the managed system; and
the manager system processing requests for the measurement variable values based on the predictive model on the manager system.

24. The program storage device of claim 23, further comprising the steps of:
the disconnectable managed system determining that the predictive model is insufficiently accurate; and
the disconnectable managed system constructing and communicating an updated predictive model to the managed system, in response to said determining.

25. The program storage device of claim 23, further comprising the step of communicating a measurement variable subscription request for a predictive model from the manager system to the managed system, wherein the predictive model is constructed in response to the subscription request.

26. The program storage device of claim 23, further comprising the step of:
the managed system measuring one or more actual values of the measurement variables and comparing an actual value against an accuracy bound; and
confirming and communicating a message to the manager system indicating the one or more actual values are within an accuracy bound.

27. The program storage device of claim 26, further comprising the steps of:
the manager system associating said measurement variable values with one or more status codes indicating how they were obtained; and
the manager system storing said measurement variable values and the status codes, in response to said associating.

28. The program storage device of claim 27, further comprising the steps of:
the manager system identifying a measurement variable value status as tentative if the measurement variable value is a predicted value which has not been confirmed as within the accuracy bound; and
the manager system changing the measurement variable value status from tentative to confirmed, in response to the message indicating the one or more actual values are within the accuracy bound.

29. The program storage device of claim 23, wherein the system includes multiple managed systems that have one or more of different collection frequencies and unsynchronized clocks, said method further comprising the steps of:
   said dynamically constructing including creating and associating a time stamp with a measurement variable value; and
   the manager system synchronizing data from the multiple managed systems, using the time stamp.

30. The program storage device of claim 29, wherein said step of the manager system synchronizing data further comprises the step of adjusting a granularity of the time stamp using the predictive models.

31. The program storage device of claim 29, wherein the unsynchronized clocks operate at a same rate, further comprising the step of:
   the manager system predicting measurement variable values at sampling intervals based on a relative time stamp indexing a set of sampling intervals.

32. The program storage device of claim 23, in an object-oriented system, further comprising the steps of:
   said dynamically constructing comprises serializing and communicating serialized predictive model objects on the managed system and reconstructing a same predictive model on the manager system based on the serialized predictive model objects.

33. The program storage device of claim 23, further comprising the step of transparently running multiple measurement acquisition protocols concurrently in the system.

34. The program storage device of claim 23, further comprising the step of:
   said dynamically constructing further comprises the step of dynamically creating the predictive model wherein the model includes a model definition, model parameters and model measurement variable inputs.

35. A program storage device readable by a machine, tangibly embodying a program of instructions executable by the machine to perform method steps for predictive model-based method for measurement data acquisition in a distributed system, said method steps comprising:
   a manager application specifying measurement variables for which a subscription is requested;
   a manager system communicating the subscription request and a desired accuracy of measurement variables to a managed system, in response to said specifying;
   the manager system and the managed system storing measured values from the managed system, in response to the subscription;
   the managed system creating and communicating a predictive model to the manager system, in response to said storing;
   the manager system satisfying requests for measurement variable values using tentative predictive values from the predictive model on the manager system; and
   the disconnectable managed system: periodically checking the accuracy of the tentative predictive values; communicating to the manager messages confirming the tentative predictive values that are within the desired accuracy; updating the predictive model if the tentative predictive values are not within the desired accuracy and communicating an updated predictive model to the manager system.

36. The program storage device of claim 35, further comprising the step of:
   the manager system receiving one or more actual measurement variable values from the measurement data access facilities on the managed system; and
   identifying and storing the actual values on the manager system.

37. A predictive model-based measurement acquisition system for creating and managing one or more predictive models that predict values of measurement variables in distributed systems, said system comprising:
   a manager system;
   a disconnectable managed system;
   means for dynamically constructing and coordinating operation of a predictive model on both the disconnectable managed system and the manager system, the predictive model adapted for predicting values of said measurement variables; and
   manager system means for processing requests for the measurement variable values based on the predictive model on the manager system.

38. The system of claim 37, further comprising:
   the disconnectable managed system including:
      agent memory means for storing the predictive model;
      an agent data access facility means for providing measured values of said measurement variables; and
      agent measurement repository means, coupled to the agent data access facility, for storing measurement variable values known to the manager; and
      an agent model handler, coupled to the agent measurement repository, for updating and operating the predictive model on the disconnectable managed system;
   the manager system including:
      manager memory means for storing the predictive model;
      manager measurement repository means for storing the measurement variable values in the memory;
      one or more management applications, coupled to the memory, for requesting and using predicted values generated on the manager system and processing measurement variable values; and
      manager model handler means, coupled to the memory, for operating the predictive model on the manager and updating the predictive model based on information communicated from the managed system.

39. A predictive model-based method for measurement data acquisition in a distributed system, comprising the steps of:
   dynamically constructing a predictive model, based on one or more non-static measurement variable values, on both a manager system and a disconnectable managed system;
   the manager system processing requests for the measurement variable values based on the predictive model on the manager system;
   the disconnectable managed system determining that the predictive model is insufficiently accurate; and
   the disconnectable managed system constructing and communicating an updated predictive model to the managed system, in response to said determining.

40. The method of claim 39, further comprising the step of the managed system disconnecting from the managed system except to update the predictive model.

41. A predictive model-based method for measurement data acquisition in a distributed system, comprising the steps of:

dynamically constructing a predictive model, based on one or more non-static measurement variable values, on both a manager system and a disconnectable managed system;

the manager system processing requests for the measurement variable values based on the predictive model on the manager system;

the managed system disconnecting from the managed system;

the managed system measuring one or more actual values of the measurement variables and comparing the actual value against an accuracy bound;

if the actual values are within an accuracy bound associated with the predictive model on the managed system: the managed system connecting and communicating a message to the manager system confirming that the actual values are within the accuracy bound; and if the actual values are not within the accuracy bound associated with the predictive model on the managed system: the managed system constructing an updated predictive model; and connecting and communicating the updated predictive model to the manager system.

42. A predictive model-based method for measurement data acquisition in a distributed system, comprising the steps of:

dynamically constructing a predictive model, based on one or more non-static measurement variable values, on both a manager system and a disconnectable managed system; and the manager system processing requests for the measurement variable values based on the predictive model on the manager system;

wherein the system includes multiple managed systems that have one or more of different collection frequencies and unsynchronized clocks, said method further comprising the steps of:

said step of dynamically constructing including creating and associating a time stamp with a measurement variable value;

the manager system synchronizing data from the multiple managed systems, using the time stamp;

wherein said step of the manager system synchronizing data further comprises the step of adjusting a granularity of the time stamp using the predictive models.

43. A predictive model-based method for measurement data acquisition in a distributed system, comprising the steps of:

dynamically constructing a predictive model, based on one or more non-static measurement variable values, on both a manager system and a disconnectable managed system; and the manager system processing requests for the measurement variable values based on the predictive model on the manager system;

wherein the system includes multiple managed systems that have one or more of different collection frequencies and unsynchronized clocks, said method further comprising the steps of:

said step of dynamically constructing including creating and associating a time stamp with a measurement variable value;

the manager system synchronizing data from the multiple managed systems, using the time stamp;

wherein the unsynchronized clocks operate at a same rate, further comprising the step of:

the manager system predicting measurement variable values at sampling intervals based on a relative time stamp indexing a set of sampling intervals.

44. A predictive model-based method for measurement data acquisition in a distributed system, comprising the steps of:

dynamically constructing a predictive model, based on one or more non-static measurement variable values, on both a manager system and a disconnectable managed system;

the manager system processing requests for the measurement variable values based on the predictive model on the manager system;

the disconnectable managed system monitoring measured values and using the predictive model on the disconnectable managed system to detect excessive deviations of predicted values from measured values;

the disconnectable managed system communicating to the manager system updates to the predictive model if said excessive deviations are detected; and the manager system updating its predictive model based on the updates.

45. A program storage device readable by a machine, tangibly embodying a program of instructions executable by the machine to perform method steps for a predictive model-based method for measurement data acquisition in a distributed system, said method steps comprising:

dynamically constructing a predictive model, based on one or more non-static measurement variable values, on both a manager system and a disconnectable managed system;

the manager system processing requests for the measurement variable values based on the predictive model on the manager system;

the disconnectable managed system determining that the predictive model is insufficiently accurate; and the disconnectable managed system constructing and communicating an updated predictive model to the managed system, in response to said determining.

46. A program storage device readable by a machine, tangibly embodying a program of instructions executable by the machine to perform method steps for a predictive model-based method for measurement data acquisition in a distributed system, said method steps comprising:

dynamically constructing a predictive model, based on one or more non-static measurement variable values, on both a manager system and a disconnectable managed system; and the manager system processing requests for the measurement variable values based on the predictive model on the manager system;

wherein the system includes multiple managed systems that have one or more of different collection frequencies and unsynchronized clocks, said method further comprising the steps of:

said step of dynamically constructing including creating and associating a time stamp with a measurement variable value; and the manager system synchronizing data from the multiple managed systems, using the time stamp;

wherein said step of the manager system synchronizing data further comprises the step of adjusting a granularity of the time stamp using the predictive models.

47. A program storage device readable by a machine, tangibly embodying a program of instructions executable by the machine to perform method steps for a predictive model-based method for measurement data acquisition in a distributed system, said method steps comprising:

dynamically constructing a predictive model, based on one or more non-static measurement variable values, on both a manager system and a disconnectable managed system; and the manager system processing requests for the measurement variable values based on the predictive model on the manager system;

wherein the system includes multiple managed systems that have one or more of different collection frequencies and unsynchronized clocks, said method further comprising the steps of:

said step of dynamically constructing including creating and associating a time stamp with a measurement variable value; and the manager system synchronizing data from the multiple managed systems, using the time stamp;

wherein the unsynchronized clocks operate at the same rate, further comprising the step of:

the manager system predicting measurement variable values at sampling intervals on a relative time stamp indexing a set of sampling intervals.

48. A predictive model-based measurement acquisition system for creating and managing one or more predictive models that predict values of measurement variables in distributed systems, said system comprising:

a manager system;

a disconnectable managed system;

means for dynamically constructing and coordinating a predictive model on both the disconnectable managed system and the manager system, the predictive model adapted for predicting values of said measurement variables; and manager system means for processing requests for the measurement variable values based on the predictive model on the manager system;

the disconnectable managed system including:

agent memory means for storing the predictive model;

an agent data access facility means for providing measured values of said measurement variables; and agent measurement repository means, coupled to the agent data access facility, for storing measurement variable values known to the manager; and an agent model handler, coupled to the agent measurement repository, for updating and operating the predictive model on the disconnectable managed system;

the manager system including:

manager memory means for storing the predictive model;

manager measurement repository means for storing the measurement variable values in the memory;

one or more management applications, coupled to the memory, for requesting and using predicted values generated on the manager system and processing measurement variable values; and manager model handler means, coupled to the memory, for operating the predictive model on the manager and updating the predictive model based on information communicated from the managed system.

\* \* \* \* \*

UNITED STATES PATENT AND TRADEMARK OFFICE
CERTIFICATE OF CORRECTION

PATENT NO. : 6,430,615 B1
DATED : August 6, 2002
INVENTOR(S) : Joseph L. Hellerstein et al.

It is certified that error appears in the above-identified patent and that said Letters Patent is hereby corrected as shown below:

Column 19,
Line 58, delete "managed" and insert -- manager --.
Line 60, after the words "from the", delete "managed" and insert -- manager --.

Column 20,
Line 2, after the words "from the", delete "managed" and insert -- manager --.

Column 22,
Line 36, before the word "system", delete "managed" and insert -- manager --.

Column 24,
Line 61, before the word "system", delete "managed" and insert -- manager --.
Line 63, after the words "from the", delete "managed" and insert -- manager --.

Column 25,
Line 8, after the words "from the", delete "managed" and insert -- manager --.

Column 26,
Line 39, before the word "system", delete "managed" and insert -- manager --.

Signed and Sealed this

Second Day of November, 2004

JON W. DUDAS
*Director of the United States Patent and Trademark Office*